(12) United States Patent
Yasunaga

(10) Patent No.: US 8,274,698 B2
(45) Date of Patent: Sep. 25, 2012

(54) IMAGE FORMING APPARATUS AND IMAGE FORMING METHOD

(75) Inventor: Yutaka Yasunaga, Hachioji (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 770 days.

(21) Appl. No.: 12/370,725

(22) Filed: Feb. 13, 2009

(65) Prior Publication Data

US 2009/0207456 A1 Aug. 20, 2009

(30) Foreign Application Priority Data

Feb. 18, 2008 (JP) ................................. 2008-036228

(51) Int. Cl.
*G06F 15/00* (2006.01)
*G06K 1/00* (2006.01)
(52) U.S. Cl. ............. 358/1.9; 283/72; 283/73; 283/903; 412/9; 412/11; 412/13; 412/14
(58) Field of Classification Search .................. None
See application file for complete search history.

(56) References Cited

U.S. PATENT DOCUMENTS

| | | | | |
|---|---|---|---|---|
| 4,921,278 | A * | 5/1990 | Shiang et al. | 283/87 |
| 6,545,636 | B1 * | 4/2003 | Shaklee et al. | 347/262 |
| 7,099,037 | B2 * | 8/2006 | Clark et al. | 358/1.18 |
| 2005/0259820 | A1 * | 11/2005 | Jones | 380/201 |

FOREIGN PATENT DOCUMENTS

| | | |
|---|---|---|
| JP | 07-087297 A | 3/1995 |
| JP | 07087297 A * | 3/1995 |
| JP | 2007-019928 | 1/2007 |

OTHER PUBLICATIONS

Notification of Reasons for Refusal issued in corresponding Japanese Application No. 2008-036228 dated Nov. 4, 2009, and an English Translation thereof.

* cited by examiner

*Primary Examiner* — Marivelisse Santiago Cordero
*Assistant Examiner* — John Wallace
(74) *Attorney, Agent, or Firm* — Buchanan Ingersoll & Rooney PC

(57) ABSTRACT

Disclosed is an image forming apparatus including: an image input unit to input image data; a chase pattern generating unit to generate a chase pattern in which a plurality of chase pattern dots, each of which has a plurality of print dots, are arranged within a predetermined block; an overlay unit to overlay the chase pattern onto the image data; an image forming unit to form an image on a sheet based on the image data onto which the chase pattern is overlaid; and an overlaid position control unit to control an overlaid position of the chase pattern on the image data so as to shift the overlaid position by a shift amount that is equal to or more than a width of each of the chase pattern dots, when forming images on a plurality of sheets.

17 Claims, 18 Drawing Sheets

IMAGE FORMING APPARATUS AND IMAGE FORMING METHOD

BACKGROUND OF THE INVENTION

1. Field of the Invention

The present invention relates to an image forming apparatus and an image forming method.

2. Description of Related Art

An image forming apparatus as a full color copying machine has been used. Since the image forming apparatus becomes cheaper than a printer, the image forming apparatus is used instead of the printer to output printed objects, and the printed objects are cut out and bound by the image forming apparatus.

With the high definition of the image forming apparatus, an image of a document can be formed more accurately. Moreover, as sheet carrying precision when forming an image on a sheet or correction precision of an image forming position is improved, precision of the image forming position with respect to a sheet is also improved. For this reason, an additional image can also be formed on a sheet with high precision.

It has been proposed that an image of a chase pattern as an additional image is formed together with image data on a sheet. The chase pattern is a pattern that has relatively poor visibility and whose color cannot easily be identified by human eyes. The chase patterns are unique patterns assigned to each image forming apparatus. Printing the chase patterns on a sheet prevents the printed object from being altered. In this regard, it has been proposed that positions of the chase patterns are varied on the sheets to enhance the prevention effect of the alteration (for example, refer to Japanese Patent Application Laid-open No. 7-87297).

Unfortunately, when forming images on a plurality of sheets by the image forming apparatus, the chase patterns may appear at edges of the sheets if a full bleed image is formed or sheet cutting is performed. The chase pattern dots may be noticeable as continuous stripes when taking a side view of a stack of the sheets.

Referring to FIGS. 19A and 19B, a specific example of an image forming processing in which stripes appear, will be explained. FIG. 19A shows sheets P81 to P84 on each of which chase pattern dots D8 constituting a chase pattern are formed. FIG. 19B shows the sheets P81 to P84 on each of which the chase pattern dots D8 are formed, being stacked. Hereinafter, the chase patterns may be referred to as chasing marks and the chase pattern dots may be referred to as chasing mark dots.

Suppose that the chasing mark dots D8 are formed at edges of the sheets P81 to P84 as shown in FIG. 19A. The chasing mark dots D8 are located at an edge of the sheet P81, for example. In this case, as shown in FIG. 19B, stripes E1 to E3 formed by the chasing mark dots D8 appear when the sheets P81 to P84 are stacked.

FIG. 20 shows a sheet P9 on which chasing marks CM9 are simply shifted. As shown in FIG. 20, suppose that the chasing marks CM9 on the sheet P9 are simply shifted in an image valid area F9, and the sheet P9 is cut out at sheet cutting positions L8 and L9. The shifted chasing mark CM9 may be located on the sheet cutting position L9. In this case, if the sheets P9 after the sheet cutting are stacked, stripes formed by the chasing marks may appear at a side of a stack of sheets P9.

SUMMARY OF THE INVENTION

It is, therefore, a main object of the present invention to form an image of a chase pattern for chasing a source of image formation on sheets, and make patterns, which are generated due to chase pattern dots at a side of a stack of image-formed sheets, less noticeable.

An image processing apparatus reflecting a first aspect of the present invention includes: an image input unit to input image data; a chase pattern generating unit to generate a chase pattern in which a plurality of chase pattern dots, each of which has a plurality of print dots, are arranged within a predetermined block; an overlay unit to overlay the chase pattern onto the image data; an image forming unit to form an image on a sheet based on the image data onto which the chase pattern is overlaid; and an overlaid position control unit to control an overlaid position of the chase pattern on the image data so as to shift the overlaid position by a shift amount that is equal to or more than a width of each of the chase pattern dots, when forming images on a plurality of sheets.

Preferably, the overlay unit overlays a plurality of chase patterns, one of which is the chase pattern, onto the image data so that the chase patterns can be arranged in blocks, and the overlaid position control unit sets the shift amount so as to be equal to or more than a width of each of the chase pattern dots and be equal to or less than an interval between the blocks.

Preferably, the overlaid position control unit controls the overlaid position so that the overlaid position is shifted for each page, each sheet, or each surface of a sheet.

Preferably, when images are formed on both surfaces of a sheet, the overlaid position control unit controls an overlaid position on N-th surface (N: natural number) of the sheet and an overlaid position on (N+1)-th surface of the sheet so that both of the overlaid positions are deviated from each other.

Preferably, when a plurality of pages of images on one surface of a sheet are formed and single-sided images are formed, the overlaid position control unit controls an overlaid position on N-th (N: natural number) sheet and an overlaid position on (N+1)-th sheet so that both of the overlaid positions are deviated from each other on pages of the N-th sheet and the (N+1)-th sheet at the same position.

Preferably, when a plurality of pages of images are formed on one surface of a sheet and when images are formed on both surfaces of a sheet, the overlaid position control unit controls an overlaid position on N-th (N: natural number) sheet and an overlaid position on (N+1)-th sheet so that both of the overlaid positions are deviated from each other on pages of the N-th sheet and the (N+1)-th sheet at the same position, and controls overlaid positions on both surfaces of a sheet so that both of the overlaid positions are deviated from each other on pages of both surfaces at the same position.

Preferably, the overlaid position control unit controls the overlaid position so that the overlaid position is shifted every predetermined plurality of pages, every predetermined plurality of sheets, or every predetermined plurality of surfaces of sheets.

Preferably, the overlaid position control unit controls the overlaid position so that the overlaid position is shifted in a main scanning direction and a sub scanning direction.

Preferably, the overlaid position control unit controls the overlaid position so that the overlaid position is shifted based on an overlay start position that is generated at random.

Preferably, the image forming apparatus further includes a storage unit to store a plurality of shift amounts, wherein the overlaid position control unit selects one of the plurality of shift amounts stored in the storage unit, and controls the overlaid position so that the overlaid position is shifted by the selected one of the plurality of shift amounts.

Preferably, when full bleed image forming is instructed, the overlaid position control unit controls the overlaid position so the overlaid position is shifted if an edge of each of the sheets coincides with a position of at least one of the chase pattern dots.

Preferably, the image forming apparatus further includes a cutting unit to cut out a stack of sheets at a sheet cutting position, wherein the overlaid position control unit controls the overlaid position so that the overlaid position is shifted if the cutting position coincides with a position of at least one of the chase pattern dots.

Preferably, the image forming apparatus further includes an input unit to input at least a sheet cutting amount by the cutting unit, wherein the overlaid position control unit determines the cutting position based on at least a sheet cutting amount that is input by the input unit.

Preferably, the overlaid position control unit sets the shift amount with respect to the block whose position coincides with the sheet cutting position or an edge of each of the sheets.

Preferably, the overlaid position control unit controls overlaid positions so that each of the overlaid positions is shifted for each of the blocks.

An image forming method of forming an image on a sheet based on image data, the method reflecting a second aspect of the present invention includes: generating a chase pattern in which a plurality of chase pattern dots, each of which has a plurality of print dots, are arranged within a predetermined block; overlaying the chase pattern onto the image data so that an overlaid position of the chase pattern on the image data is shifted by a shift amount that is equal to or more than a width of each of the chase pattern dots, when images are formed on a plurality of sheets; and forming images on the sheets based on the image data onto which the chase pattern is overlaid.

Preferably, in the overlaying, a plurality of chase patterns, one of which is the chase pattern, are overlaid onto the image data so that the chase patterns can be arranged in blocks, and an overlaid position of each of the chase patterns on the image data is shifted by the shift amount that is equal to or more than a width of each of the chase pattern dots and is equal to or less than an interval between the blocks.

Preferably, in the overlaying, the overlaid position is shifted for each page, each sheet, or each surface of a sheet.

Preferably, in the overlaying, the overlaid position is shifted every predetermined plurality of pages, every predetermined plurality of sheets, or every predetermined plurality of surfaces of sheets.

Preferably, the method further includes: cutting out a stack of sheets at a sheet cutting position, wherein in the overlaying, the overlaid position is shifted if the cutting position coincides with a position of at least one of the chase pattern dots.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1:
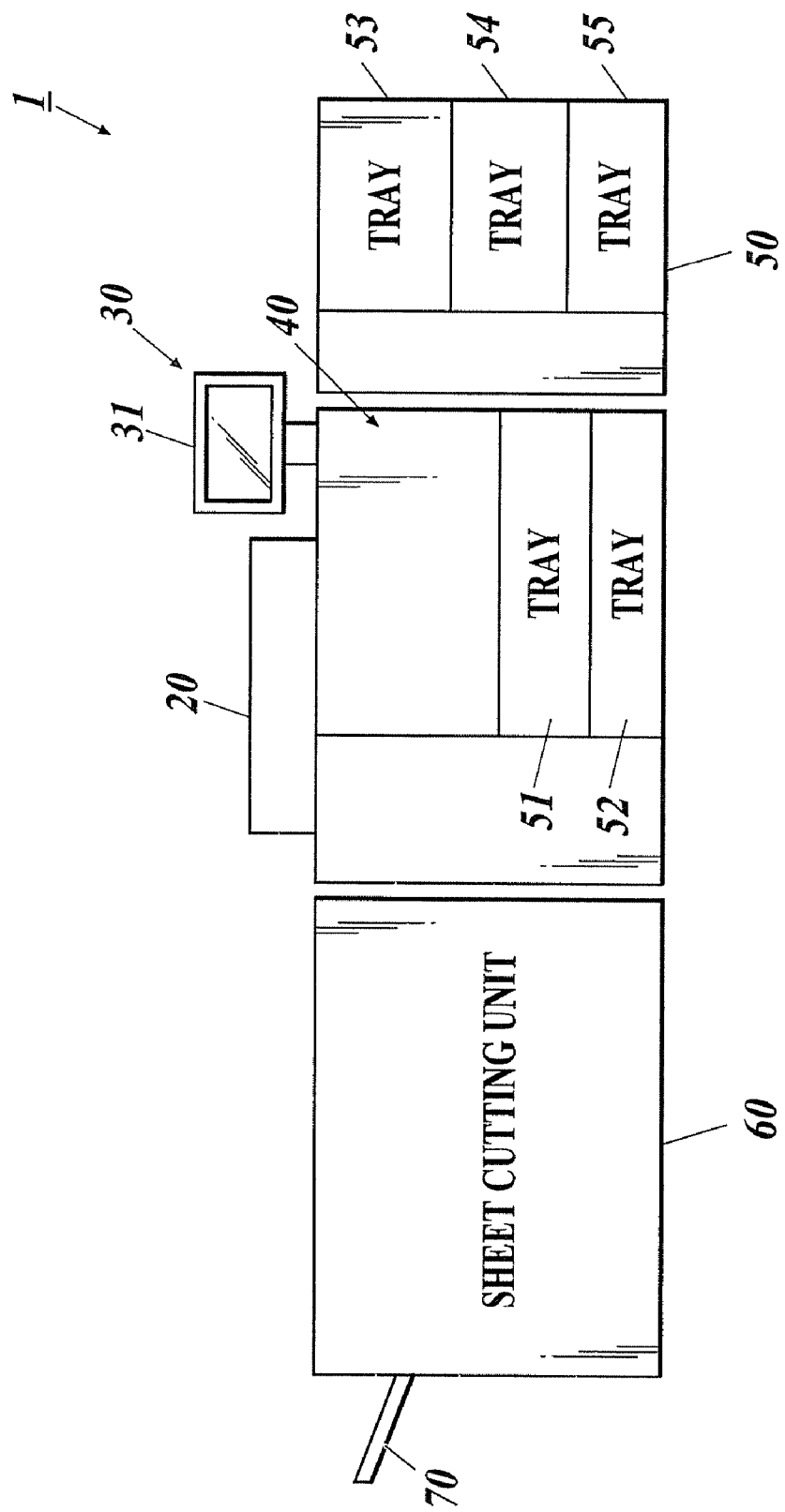
FIG. 1 shows a schematic view of an image forming apparatus according to a first embodiment of the present invention.

First and second embodiments of the present invention and modifications of the respective embodiments will be explained below in detail with reference to the drawings. The present invention is not to be considered limited to what is shown in the drawings and the following detailed description.

First Embodiment

Figure 2:
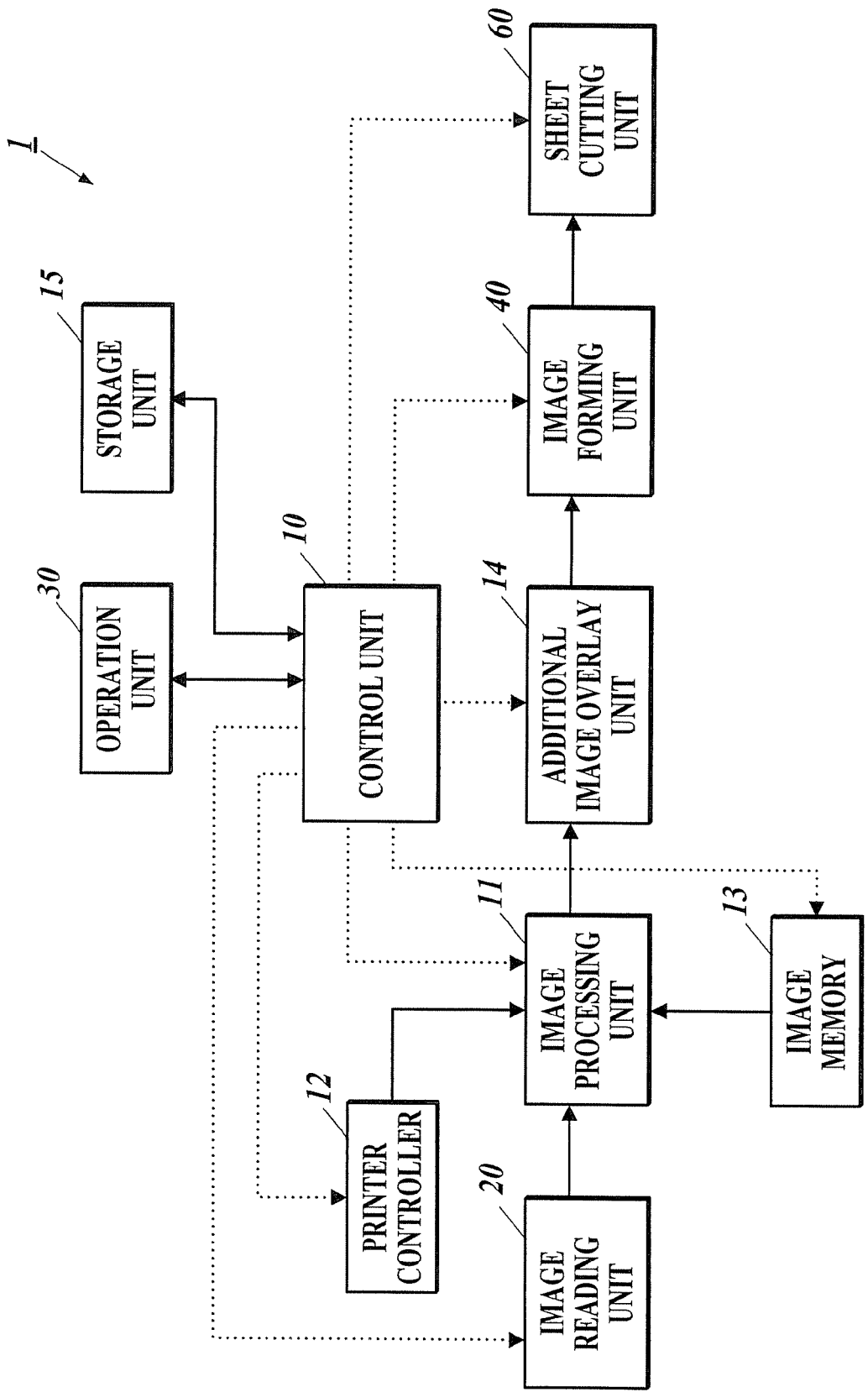
FIG. 2 is a block diagram showing an internal configuration of the image forming apparatus.
Figure 3:
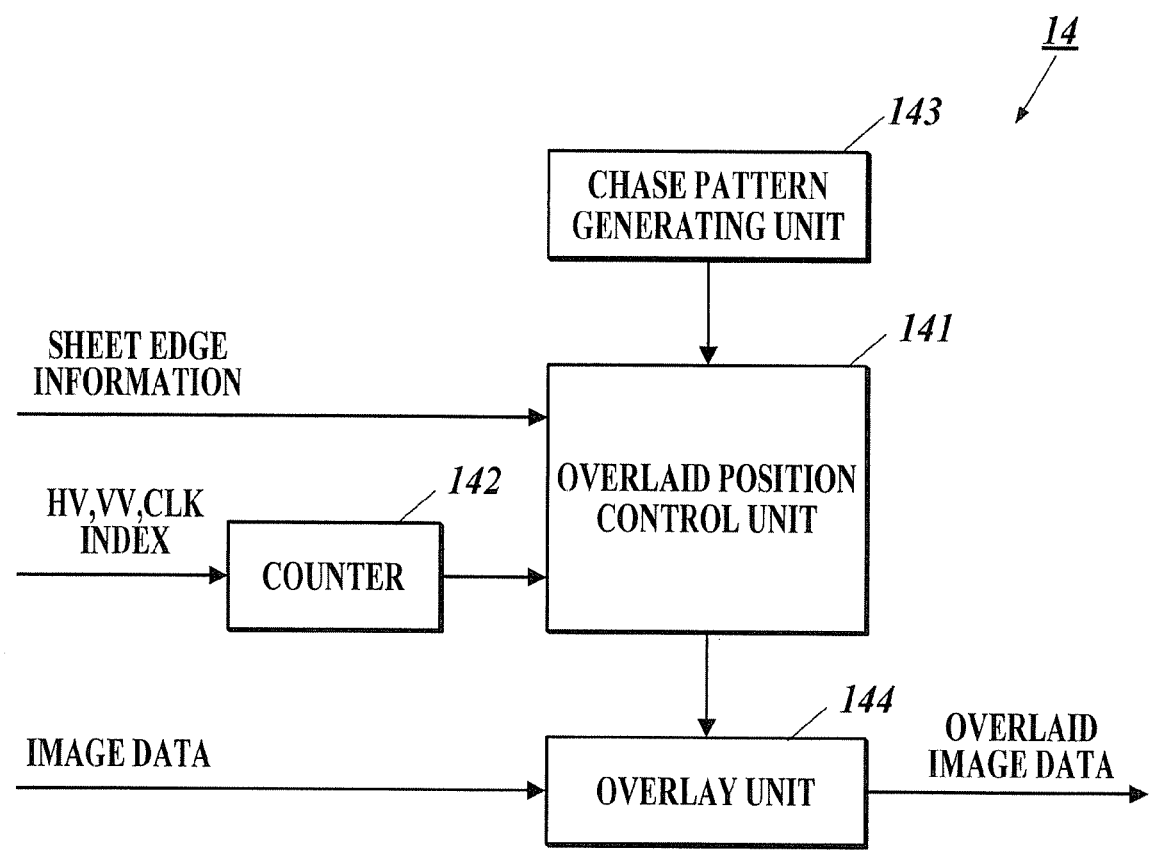
FIG. 3 shows a configuration of an additional image overlay unit.

A first embodiment of the present invention will be described with reference to FIGS. 1 to 9. First, referring to FIGS. 1 to 3, a configuration of an image forming apparatus according to this embodiment will be described. FIG. 1 shows an image forming apparatus 1 according to this embodiment. FIG. 2 shows an internal configuration of the image forming apparatus 1. FIG. 3 shows a configuration of an additional image overlay unit 14.

Although a copying machine is employed as the image forming apparatus 1 in this embodiment, a printer may be employed as the image forming apparatus 1.

As shown in FIG. 1, the image forming apparatus 1 includes an image reading unit 20, an operation unit 30, an image forming unit 40, a paper feed unit 50, and a sheet cutting unit 60 that functions as a post-processing unit.

The image reading unit 20 includes an ADF (Auto Document Feeder) (not shown) that is an auto document feed mechanism and a scanner section (not shown).

Specifically, in accordance with an instruction from a control unit 10 which will be described in detail later on, the ADF unit carries a document, which is placed on a document feed tray, to a reading position of the scanner section. The scanner section emits light onto the document on the reading position, read reflected light by photoelectrically converting the reflected light by a CCD (Charge Coupled Device) to obtain an electric signal, and outputs the electric signal as an analog image signal. After reading the document image by the scanner section, the document is output to an output tray.

The operation unit 30 includes a display unit 31 that is composed of an LCD (Liquid Crystal Display), and a touch panel is formed integrally with the display unit 31. The operation unit 30 displays a variety of display information, which is transmitted from the control unit 10, on the display unit 31, receives input operation information by a touch operation from a user, and outputs the operation information to the control unit 10.

The image forming unit 40 forms a color image by an electrophotographic method. The mage forming unit 40 forms an image on a sheet in accordance with an instruction from the control unit 10. Specifically, the image forming unit 40 includes a carrying mechanism (not shown) that carries sheets fed from a paper feed unit 50, a printer section (not shown) that forms a toner image corresponding to image data on the sheet, and a fixing unit (not shown) that heats and pressurizes the toner image on the sheet to fix the toner image.

The printer section includes a photoconductor drum that is an image carrier, an electrostatic charging unit that electrifies the photoconductor drum, an exposure unit that exposes and scans a surface of the photoconductor drum on the basis of image data, a developing unit that develops an electrostatic latent image on the photoconductor drum, a transfer unit that transfers the toner image formed on the photoconductor drum to an endless transfer belt, and a cleaning unit that removes residual toners on the photoconductor drum. Each unit of the printer section is provided for each color, i.e. yellow (Y), magenta (M), cyan (C), and black (K). The individual toner images for YMCK are transferred to the transfer belt by the printer section, and are fixed on the sheets by the fixing unit. In this embodiment, the electrophotographic method is applied to the image forming unit 40. Other printing methods such as ink-jet printing and heat sublimation printing may also be applied to the image forming unit 40.

The paper feed unit 50 includes trays 51, 52, 53, 54, and 55 that accommodate various types of sheets for paper feed. The trays 51, 52, 53, 54, and 55 are configured to accommodate different types of sheets depending on paper types (such as plain paper, recycled paper, high quality paper, backing paper), sizes, colors, and whether the sheets have punch holes or not.

The number of trays is not limited to the number of trays that are shown in FIG. 1, but may be arbitrary. The sheet may be made of a material other than paper, such as an OHP (Over Head Projector) sheet.

The sheet cutting unit 60 has a function of cutting a stack of image-formed sheets, and includes an output tray 70. In addition to the sheet cutting unit 60, the image forming apparatus 1 may include the following units as post-processing units: a punch unit that punches holes for filing in printed sheets; a staple unit for stapling the sheets; and a binding unit for binding. If sheet cutting execution is set, the printed object on which an image has been formed by the image forming unit 40 is cut out by the sheet cutting unit 60. The sheets after the cutting are collected on the output tray 70. Whether to execute the sheet cutting is set through an input operation of the operation unit 30 by an operator. If image forming is performed by the image forming apparatus 1 based on printing data transmitted from an external information processing device, the sheet cutting execution is set through an operation screen by a printer driver of an information processing apparatus, and information indicating the sheet cutting execution is transmitted to the image forming apparatus 1.

The image forming apparatus 1 also includes a conveyance unit (not shown) that carries sheets. The conveyance unit carries sheets fed from the paper feed unit 50 to the image forming unit 40 to form images on the sheets, and carries the imaged formed sheets to the output tray. The conveyance unit has an inversion unit. When forming double-sided images, the conveyance unit causes the inversion unit to reverse a sheet on one surface of which an image is formed by the image forming unit 40 and carries the sheet to the image forming unit 40. The image forming unit 40 forms an image on the other surface (back surface) of the sheet.

As shown in FIG. 2, the image forming apparatus 1 includes a control unit 10, an image reading unit 20 as an image input unit, an image processing unit 11, a printer controller 12 as an image input unit, an image memory 13 as an mage input unit, an additional image overlay unit 14, a storage unit 15, an image forming unit 40, and a sheet cutting unit 60.

The control unit 10 includes a CPU (Central Processing Unit), a RAM (Random Access Memory), and a ROM (Read Only Memory). In the control unit 10, a specified program of various programs stored in the ROM is read out and loaded into the RAM. The CPU executes various processing in cooperation with the loaded program. The ROM stores a first image forming program.

When image data is input from an image input unit such as the image reading unit 20, the control unit 10 causes the additional image overlay unit 14 to set an image forming start position so that positions of chasing mark dots cannot coincide with a sheet edge or a sheet cutting position and to overlay pattern image data of the chasing mark onto the input image data to generate an overlaid image data, and causes the image forming unit 40 to form an image on a sheet based on the overlaid image data, in accordance with the first image forming program.

The image processing unit 11 executes various image processing with respect to the image data that is input from the image reading unit 20, the printer controller 12 or the image memory 13, and outputs the image data to the control unit 10 or the image memory 13. The image processing unit 11 converts an analog image signal, which is input from the image reading unit 20, into digital image data or expands and outputs input compression image data. The image processing unit 11 compresses the input image data and outputs the compressed image data to the image memory 13 to store the compressed image in the image memory 13.

The image processing unit 11 generates image write signals such as a horizontal valid signal HV (Horizontal Valid) indicating an image valid range in a horizontal (main scanning) direction, a vertical valid signal VV (Vertical Valid) indicating an image valid range in a sub scanning (vertical) direction, and a clock signal CLK. The image processing unit 11 outputs the generated signals to the control unit 10. For example, the clock signal CLK is generated by a quartz resonator that is provided in the image processing unit 11 (in a substrate that has the image processing unit). The clock signal CLK and an INDEX signal that is input from the image forming unit 40 to the image processing unit 11 are set as timing signals (reference signals). The image processing unit 11 generates the horizontal valid signal HV and the vertical valid signal VV on the basis of the timing signals and HV information and VV information (start information and width information) set in the image processing unit 11, and outputs the clock signal CLK, the INDEX signal, the horizontal valid signal HV, and the vertical valid signal VV to the additional image overlay unit 14. The INDEX signal is a signal that indicates an index of a sub scanning direction location of each line of an image.

When the image forming apparatus 1 is used as a network printer, the printer controller 12 outputs to the image forming apparatus 1 image data that is transmitted from an external apparatus (information processing apparatus), such as a PC (Personal Computer), which is connected to a LAN (Local Area Network).

The image memory 13 is composed of an HDD (Hard Disk Drive) or a semiconductor memory, and stores image data such that read and write operations are enabled. The image memory 13 stores the image data input from the printer controller 12 or the image reading unit 20 and holds the image data in accordance with a storage instruction from the control unit 10, or reads out the image data stored in the image memory 13 in accordance with a read instruction from the control unit 10 and outputs the image data to the image processing unit 11.

The additional image overlay unit 14 will be described in detail later on.

The storage unit 15 includes a memory such as a ROM and a flash memory. The storage unit 15 as a computer-readable medium stores information such as a serial number of the image forming apparatus 1, chasing mark sizes, ChaseMarkX, ChaseMarkY, a dot digit number CHSR_NUM, a dot X size DotSizeX and a dot Y size DotSizeY as widths of chase pattern dots, a dot formation X interval HSPC, a dot formation Y interval VSPC, and an additional image shift sheet number, which will be described in detail later on.

In accordance with an instruction from the control unit 10, the image forming unit 40 forms an image on a sheet based on the image data from the additional image overlay unit 14, and carries the image-formed sheet to the sheet cutting unit 60. The image forming unit 40 has a writing unit that actually forms an image. The image forming unit 40 generates the INDEX signal in response to a writing start signal that is output from the writing unit and activated for each image formation line, and outputs the INDEX signal to the image processing unit 11. The image forming unit 40 has a function of forming a full bleed image. The formation of the full bleed image means that an image is formed on a sheet without a margin.

The sheet cutting unit 60 cuts out the sheet that is carried from the image forming unit 40 in accordance with a sheet cutting instruction from the control unit 10, and outputs the sheet to the output tray.

As shown in FIG. 3, the additional image overlay unit 14 includes an overlaid position control unit 141, a counter 142, a chase pattern generating unit 143, and an overlay unit 144.

The chase pattern generating unit 143 generates unique pattern image data, of chasing mark for each image forming apparatus on the basis of information such as a serial number, which is stored in the storage unit 15, and outputs the pattern image data to the overlaid position control unit 141.

The counter 142 receives the horizontal valid signal HV, the vertical valid signal VV, the clock signal CLK, and the INDEX signal from the image processing unit 11. The counter 142 generates a first count value to grasp an image forming position in a main scanning direction using the horizontal valid signal HV and the clock signal CLK. The counter 142 generates a second count value to grasp an image forming position in a sub scanning direction using the vertical valid signal VV and the INDEX signal. The counter 142 outputs the first and second count value signals to the overlaid position control unit 141.

The overlaid position control unit 141 receives sheet edge information from the control unit 10, the pattern image data from the chase pattern generating unit 143, and the first and second count values from the counter 142. The sheet edge information is information indicating a position of the sheet edge in an output state. For example, when a sheet size and a sheet cutting position of an image formation subject are set and input through an input operation of the operation unit 30 by a user, the sheet edge information indicating a sheet edge at an output step according to the setting information is generated by the control unit 10 and input into the overlaid position control unit 141.

The overlaid position control unit 141 generates image forming position information indicating an image forming start position of the pattern image data on the sheet, on the basis of the sheet edge information, the pattern image data, and the first and second count values. The overlaid position control unit 141 outputs the image forming position information together with the pattern image data to the overlay unit 144.

The overlay unit 144 receives the image data of the image formation subject (original image) from the image processing unit 11, and the pattern image data and the image forming position information from the overlaid position control unit 141. The image data is input into the overlay unit 144 in synchronization with image writing information such as the horizontal valid signal HV. The overlay unit 144 overlays the input pattern image data at the image forming position of the image forming position information and outputs the image data as overlaid image data to the image forming unit 40.

Figure 4:
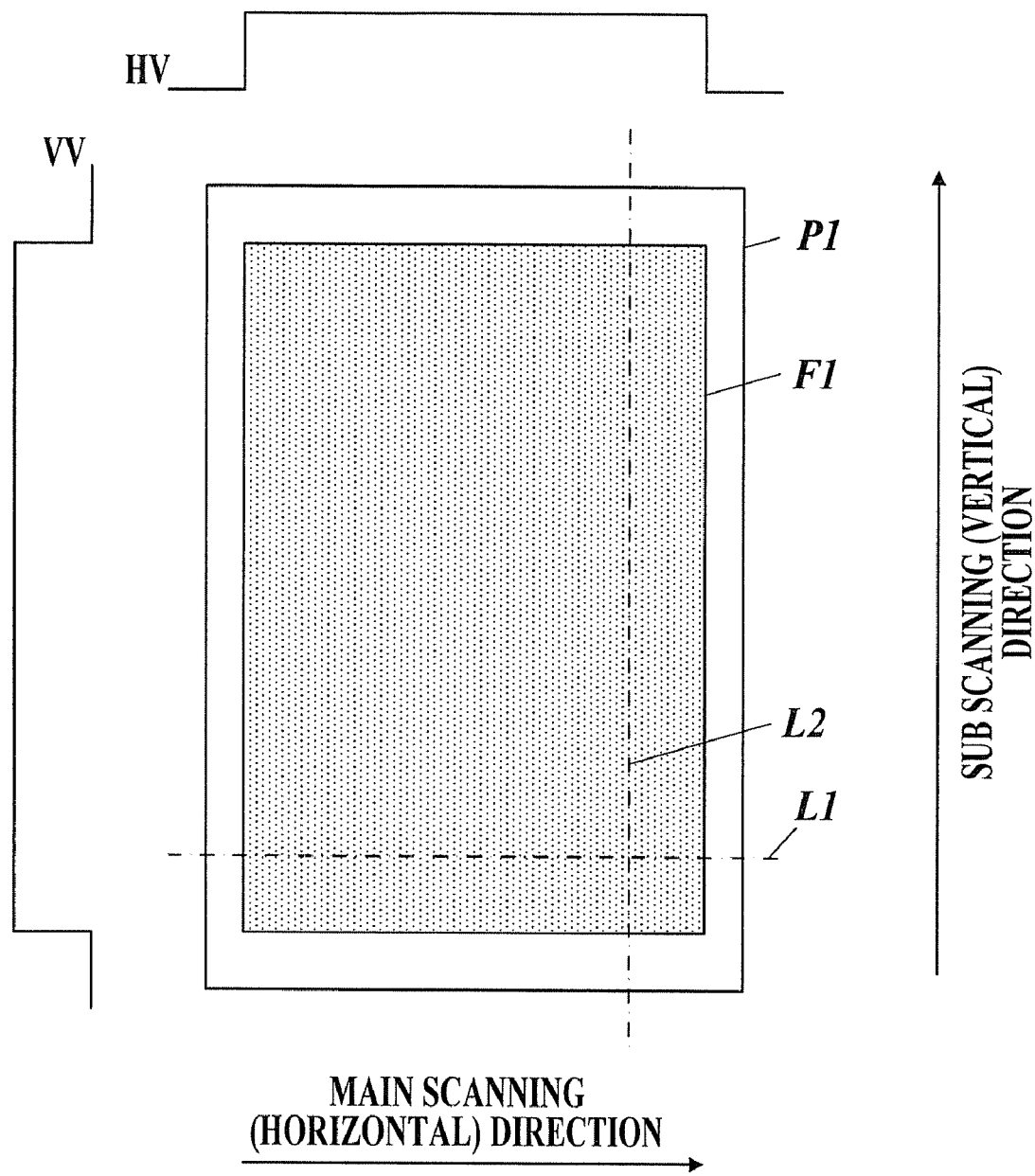
FIG. 4 shows a relationship between an image valid area and sheet cutting positions on a sheet.

Next, an operation of the image forming apparatus 1 will be described with reference to FIGS. 4 to 9. In this embodiment, the image forming apparatus 1 for forming a single-sided image will be described. First, an example of an overlay of chasing marks (chase patterns) as an additional image in this embodiment will be described with reference to FIGS. 4 to 7. FIG. 4 shows a relationship between an image valid area F1 and sheet cutting positions L1 and L2 on a sheet P1.

As shown in FIG. 4, with respect to the sheet P1, an image is formed on the image forming area F1 where the horizontal valid signal HV and the vertical valid signal VV are valid. That is, an image of image data and an image of chasing marks are formed on the image forming area F1. Based on the sheet cutting position L1 in a main scanning direction and the sheet cutting position L2 in a sub scanning direction, the sheet P1 is cut out including the image forming area F1. If the chasing mark dots are formed on the sheet cutting positions L1 and L2, stripes are observed when taking a side view of a stack of the sheets P1. In this embodiment, however, the positions of chasing marks are moved for each sheet.

Figure 5:
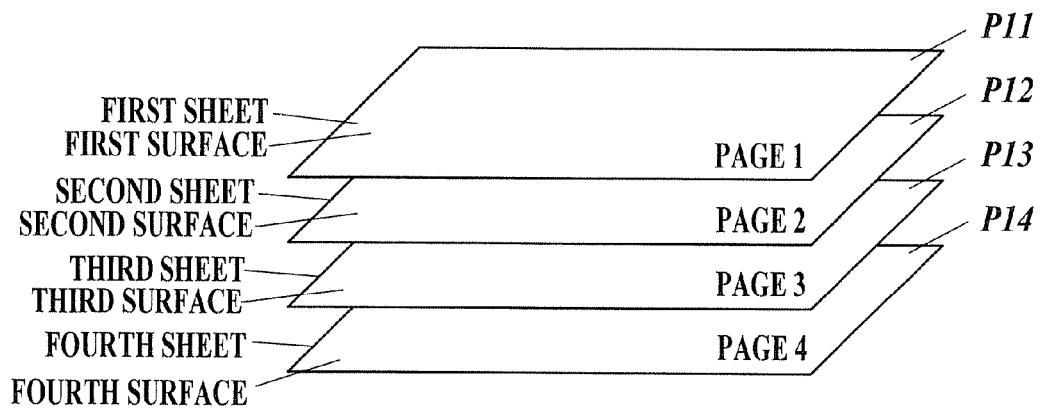
FIG. 5 shows a relationship between sheets and pages when forming a single-sided image.

FIG. 5 shows a relationship between sheets and pages when forming a single-sided image. Suppose that a sheet P1 of an n-th (n: natural number) sheet is represented as a sheet P1*n*. As shown in FIG. 5, pages 1 to 4 correspond to sheets P11 to P14. Each page is configured to have one image (image valid area).

Figure 6:
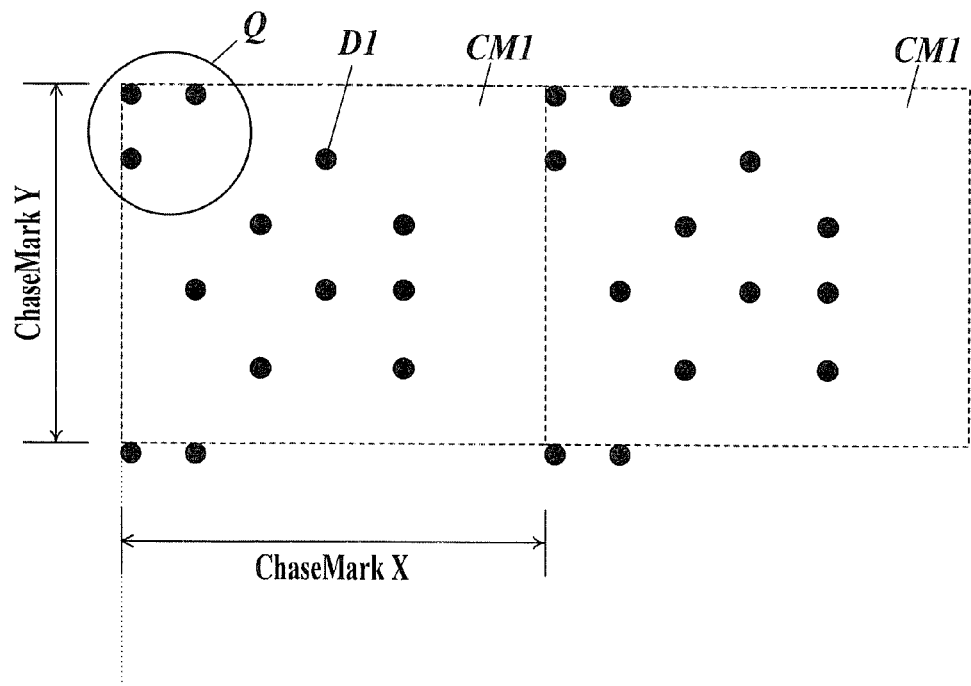
FIG. 6 shows an example of chasing marks.

FIG. 6 shows an example of chasing marks. As shown in FIG. 6, the additional image has the configuration where a plurality of chasing marks CM1, each of which has a horizontal length as a chasing mark size ChaseMarkX and a vertical length as a chasing mark size ChaseMarkY, are arranged in horizontal and vertical directions. In each of the chasing marks CM1, a plurality of chasing mark dots D1 are formed uniquely and regularly arranged patterns in each image forming apparatus. The dot digit number CHSR_NUM that indicates the number of chasing mark dots D1 in each of the chasing marks CM1 is set as 11.

The chasing mark dots D1 are composed of a plurality of print dots. The chasing mark dots D1 are formed with a color that cannot be easily identified by human eyes. This color is yellow, for example.

Figure 7:
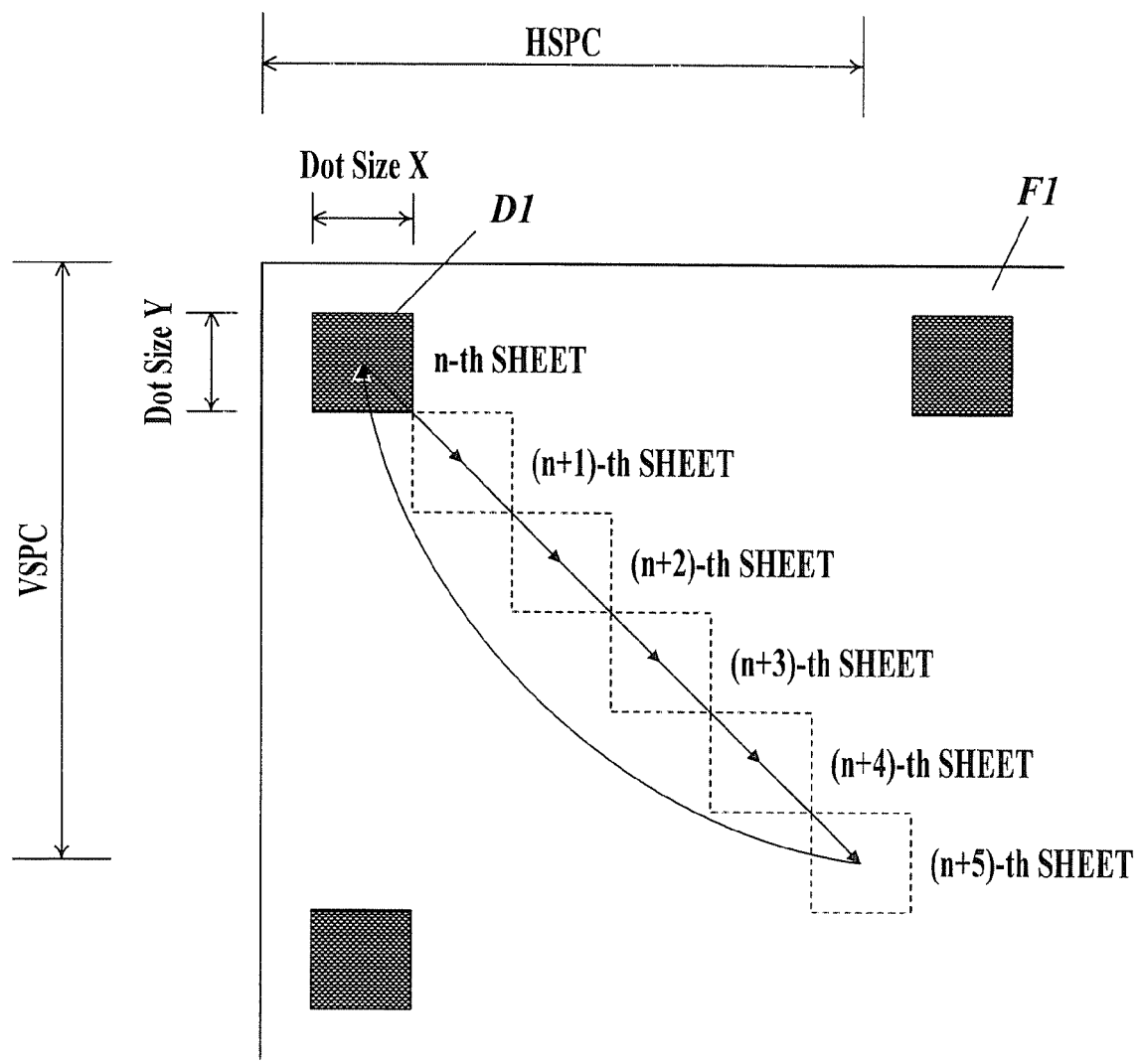
FIG. 7 shows an enlarged view of an area of the chasing mark shown in FIG. 6.

FIG. 7 shows an enlarged view of an area Q of the chasing mark CM1 shown in FIG. 6. As shown in FIG. 7, the image forming start position of the chasing mark CM1 is moved within the dot formation X interval HSPC in a horizontal direction and the dot formation Y interval VSPC in a vertical direction on the image forming area F1. For example, as shown in FIG. 7, the horizontal length of the chasing mark dot D1 is set as the dot X size DotSizeX and the vertical length is set as the dot Y size DotSizeY. The number of times of repeating dot movement is set as a smaller value of HSPC/DotSizeX or VSPC/DotSizeY. The image forming start position of the chasing mark CM1 may be a point (0, 0) of an upper left corner on the image valid area F1.

Suppose that the chasing mark dot D1 has a value of the dot X size DotSizeX=2 and a value of the dot Y size DotSizeY=2, and the dot formation X interval HSPC=12 and the dot formation Y interval VSPC in a vertical direction=12. In this case, the number of times of repeating dot movement is 6. As such, the chasing mark CM1 is moved by a movement distance (shift amount) of 2×2 for ach sheet, and the image forming start position of the chasing mark CM1 is circulated for every 6 sheets. The movement distance is defined as a width of the chasing mark dot D1 or more. Specifically, the movement distance in a horizontal direction is defined as the dot X size DotSizeX or more, and the movement distance in a vertical direction is defined as the dot Y size DotSizeY or more. More specifically, the movement distance (shift amount) in each of the horizontal direction and the vertical direction is exemplified as two dots, but may be, for example, three dots that are larger than the two dots.

As shown in FIG. 7, if a location of an upper left chasing mark dot D1 of the chasing mark CM1 is set as an initial location at the sheet of the n-th (n: arbitrary natural number) page, the image forming position is moved until the sheets of the (n+1)-th to (n+5)-th pages, and at the sheet of the (n+6)-th page, the image forming position is moved to the initial location.

Figure 8:
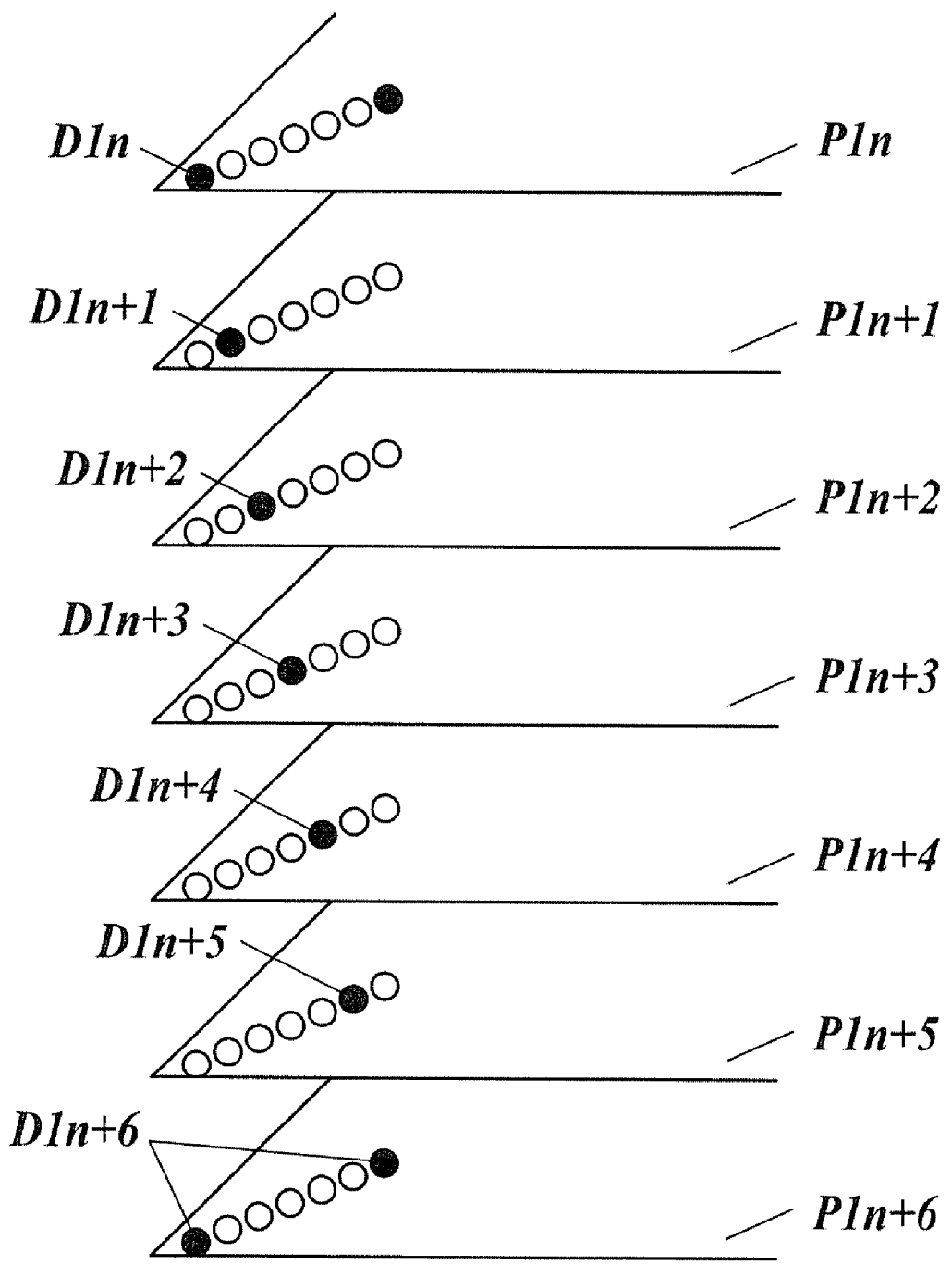
FIG. 8 shows an example of movement of an image forming start position between a plurality of sheets.

FIG. 8 shows an example of movement of an image forming start position between a plurality of sheets P1. The chasing mark dot D1 at the n-th sheet P1 is represented by a chasing mark dot D1$n$. As shown in FIG. 8, the positions of the chasing mark dots D1$n$ to D1$n$+5 are shifted from the sheet P1$n$ to the sheet P1$n$+5, and the position of the chasing mark dot D1$n$+6 on the sheet P1$n$+6 is the same as the position of the chasing mark dot D1$n$. In this case, if the position of the chasing mark dot D1$n$ is on an edge of the sheet P1, the chasing mark dot D1 appears on the edge of the sheet P1 for every 6 sheets.

Figure 9:
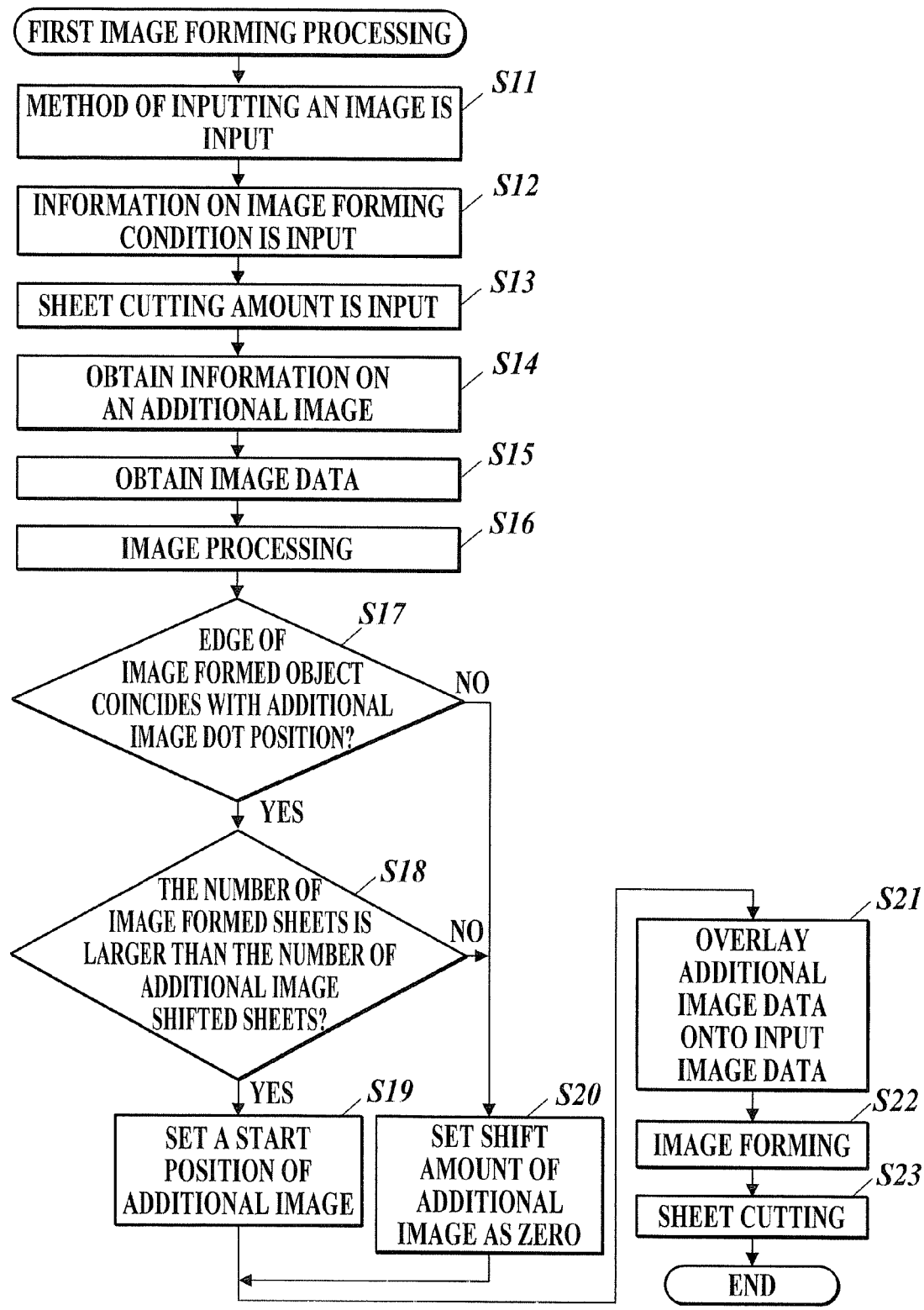
FIG. 9 shows a flowchart of a first image forming processing.

Referring to FIG. 9, a first image forming processing executed by the image forming apparatus 1 will be described. FIG. 9 shows a flow of the first image forming processing.

For example, the first image forming processing is executed by the control unit 10 when an execution instruction of the image forming processing is input through the operation unit 30. The first image forming processing is an image forming processing in which an image forming start position of the chasing mark is shifted between the sheets, and the chasing mark is overlaid onto the image data.

First, a method of inputting an image of an image to be formed is received through the operation unit 30 from the user (Step S11). For example, any one of document scanning of the image reading unit 20, reception of image data from an external apparatus through the printer controller 12, and reading of the image data from the image memory 13 is selected. In Step S11, when the image data is input from the external apparatus, information of the image input method from the external apparatus may be transmitted to the image forming apparatus 1. In Steps S12 and S13, information may be input from the external apparatus.

Next, image formation condition information, such as size information of sheets where images are to be formed, is input through the operation unit 30 by user operation (Step S12). Examples of the image formation condition information that is input in Step S12 may include a specification of a single-sided image formation or double-sided image formation, sizes and types of sheets, the number of sheets where images are to be formed, and an instruction of full bleed image formation. When the full bleed image is formed, the instruction of full bleed image formation is input through the operation unit 30 in step S12. In this case, single-sided image formation is specified.

Then, at least sheet cutting amount is input through an input operation of the operation unit 30 by a user (Step S13). The sheet cutting position corresponds to at least the sheet cutting amount that is input through the operation unit 30. When the sheet is not cut, a message indicating that the sheet is not cut is input. In particular, sheet edge information (sheet cutting position) is generated on the basis of the size of the sheet input in Step S12 and at least the sheet cutting amount input in Step S13, and input to the overlaid position control unit 141. In this embodiment, the sheet cutting position is determined on the basis of the sheet cutting amount that is input from the operation unit 30. However, in the image forming apparatus in which the sheet cutting direction can be specified, the sheet cutting amount and the sheet cutting direction (for example, a specification of one direction of only a fore edge or specifications of three directions of a head edge, a tail edge and a fore edge) may be input from the operation unit 30, and the sheet cutting position may be determined on the basis of the input sheet cutting amount and the input sheet cutting direction.

Next, information on an additional image is obtained (Step S14). In Step S14, for example, as the information about the additional image, pattern image data of the chasing mark is generated by the chase pattern generating unit 143. In addition to the pattern image data, the chasing mark sizes ChaseMarkX and ChaseMarkY, the dot digit number CHSR_NUM, the dot X size DotSizeX, the dot Y size DotSizeY, the dot formation X interval HSPC, the dot formation Y interval VSPC, and the number of additional image shifted sheets are read out from the storage unit 15 and acquired.

Then, in accordance with the image inputting method set in Step S11, image data to be formed is obtained by reading the document by the image reading unit 20, obtained through the printer controller 12, or read out from the image memory 13 (Step S15). Next, an image processing is executed by the image processing unit 11 with respect to the image data which is input in Step S15 (Step S16).

An edge of an image-formed object is defined by the sheet size which is input in Step S12 and the cutting position based on at least the sheet cutting amount which is input in Step S13. In Step S17, it is determined whether the edge of the image-formed object coincides with a dot position of the additional image (hereinafter referred to as "additional image dot position") based on the pattern image data. The image-formed object is a stack of image-formed sheets. If a full bleed image is formed, the image-formed object is a stack of full bleed image-formed sheets. When the sheets are cut out, the image-formed object is a stack of sheets which are cut out and where images are formed. For example, in FIG. 4, under the condition that an overlaid position of pattern image data on the image data is not adjusted, it is determined whether the positions of the chasing mark dots D1 coincide with the edge of the sheet P1 or sheet cutting positions L1 and L2 of the sheet P1. When forming the full bleed image, it is determined whether the sheet edge coincides with the positions of the chasing mark dots. The additional image dot position is generated on the basis of the first and second count values output from the counter 142 and the pattern image data.

If the edge of the image-formed object coincides with the additional image dot position (Step S17; YES), it is determined whether the number of image-formed sheets input in Step S12 is larger than the number of additional image shifted sheets, which is obtained in Step S14 (Step S18). The number of additional image shifted sheets is defined as the number of repeat until a shift position of the chasing mark as the additional image returns to an original position. For example, as shown in FIG. 8, when the shift position returns to the original position on the sixth sheet, the number of additional image shifted sheets is 6. An appropriate value of the number of additional image shifted sheets is set in accordance with types (thickness) of sheets.

If the number of image-formed sheets is larger than the number of additional image shifted sheets (Step S18; YES), the additional image start positions corresponding to the number of additional image shifted sheets are determined and set by the overlaid position control unit 141 (Step S19). For example, the additional image start positions correspond to positions of the chasing mark dots D1 on the n-th to (n+5)-th sheets from the predetermined sheet position, as shown in FIG. 7.

If the edge of the image-formed object does not coincide with the additional image dot position (Step S17; NO) or the number of image-formed sheets is not larger than the number of additional image shifted sheets (Step S18; NO), a shift amount of the additional image start position is set as zero by the overlaid position control unit 141 without shifting the chasing mark as the additional image (Step S20).

Then, by using the additional image start positions which are set in Step S19 or S20 as base points, the pattern image data is overlaid onto the image data that is input in Step S12 by the overlay unit 144 to generate overlaid image data (Step S21). Next, an image is formed on a sheet by the image forming unit 40 on the basis of the overlaid image data generated in Step S21 (Step S22). Then, in accordance with the sheet cutting amount that is input in Step S13, the sheet on which the image is formed in Step S22 is cut out Step S23), and the image forming processing is terminated.

Figure 10A:
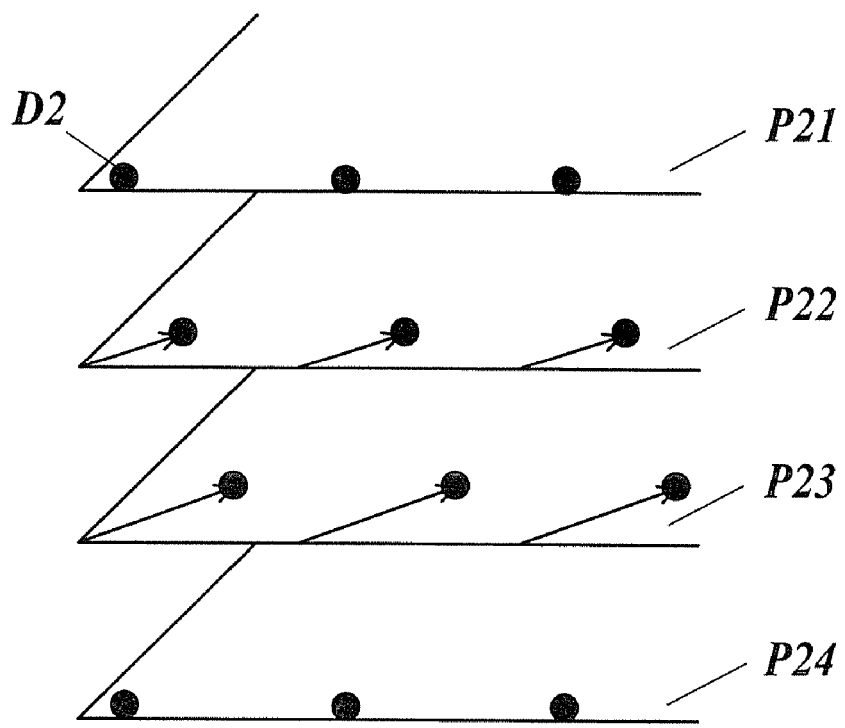
FIG. 10A shows sheets on each of which chasing mark dots are formed according to the first embodiment.
Figure 10B:
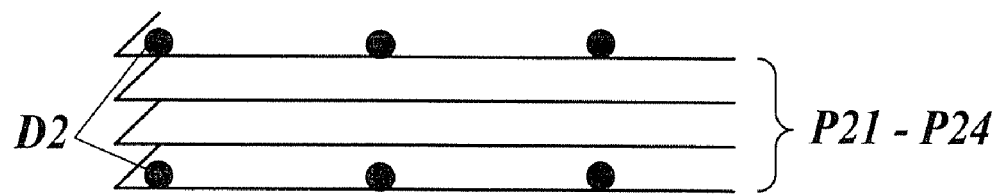
FIG. 10B shows the sheets on each of which the chasing mark dots are formed, being stacked according to the first embodiment.

Referring to FIGS. 10A and 10B, a specific example of the first image forming processing according to this embodiment will be described. FIG. 10A shows sheets P21 to P24 on each of which chasing mark dots D2 are formed. FIG. 10B shows the sheets P21 to P24 on each of which the chasing mark dots D2 are formed, being stacked.

For example, as shown in FIG. 10A, the chasing mark dots D2 as a portion of a chasing mark are formed on the sheets P21 to P24. In this case, the number of sheets where the additional image is shifted is three. As shown in FIG. 10B, in the case where the chasing mark dots D2 are located at a sheet edge of the sheet P21, even when the sheets P21 to P2n overlap each other, stripes of the chasing mark dots D2 do not appear.

As described above, according to this embodiment, the chasing mark for chasing a source of the image formation can be formed on the sheet, and the overlaid positions of the chasing marks are shifted by at least the dot X size DotSizeX and the dot Y size DotSizeY. Therefore, the chasing mark dots do not overlap with the sheet cutting position on the sheet on which an image is formed or the edge of the sheet on which the full bleed image is formed, and patterns which are generated due to chasing mark dots at a side of a stack of image-formed sheets, become less noticeable.

Moreover, when the single-sided image is formed, the overlaid positions of the chasing marks are shifted for each page (or for each sheet, or for each surface of the sheet). Therefore, the chasing mark dots do not overlap with the sheet cutting position on which the image is formed or the edge of the sheet on which the full bleed image is formed, and the patterns which are generated due to the chasing mark dots at a side of the sheet cutting position of a stack of the sheets or at a side of the edge of a stack of the sheets, become less noticeable.

When the full bleed image forming is instructed, the overlaid positions of the chasing marks are shifted if the sheet edge coincides with the chase pattern dot position. For this reason, the chasing mark dots do not overlap with the edge of the sheet on which the full bleed image is formed, and the patterns which are generated due to the chasing mark dots at a side of the edge of a stack of the sheets, become less noticeable. Moreover, unnecessary shifting can be prevented.

When the sheet cutting is performed, the overlaid position of the chasing mark is shifted if the sheet edge (sheet cutting position) after the sheet cutting coincides with the chasing mark dot position. Therefore, the chasing mark dots do not overlap with the sheet cutting position of the sheet on which the image is formed, and the patterns which are generated due to the chasing mark dots at a side of the sheet cutting position of a stack of the sheets, become less noticeable. Moreover, the unnecessary shifting can be prevented.

If the sheet cutting amount (and the sheet cutting direction) is configured to be input through the operation unit 30, the desired sheet cutting amount (and the desired sheet cutting direction) can be easily input, and the sheet cutting position can be easily determined in accordance with the input sheet cutting amount (and the input sheet cutting direction).

Second Embodiment

Referring to FIGS. 11 to 15, a second embodiment of the present invention will be described. In this embodiment, as with the first embodiment, the image forming apparatus 1 is used. For this reason, in this embodiment, the same configuration as that of the first embodiment will not be explained, and a configuration different from that of the first embodiment will mainly be described. It should be noted that chasing marks are arranged in blocks, and a pattern image (dot area which will be described in detail later on) as a chase pattern is provided in a block of the chasing mark.

A ROM of the control unit 10 stores a second image forming program instead of the first image forming program. The control unit 10 executes a second image forming processing (which will be described in detail later on), on the basis of the second image forming program.

The storage unit 15 stores a chasing mark size Chase-MarkX, a chasing mark size ChaseMarkY, a chasing mark X size ChaseXdot, a chasing mark Y size ChaseYdot, a chasing mark block X interval marginX, a chasing mark block Y interval marginY, a dot formation X interval HSPC, a dot formation Y interval VSPC, a dot X size DotSizeX, a vertical direction dot Y size DotSizeY, a character number Char_NUM_X, and a character number Char_NUM_Y, which will be described in detail below.

Figure 11:
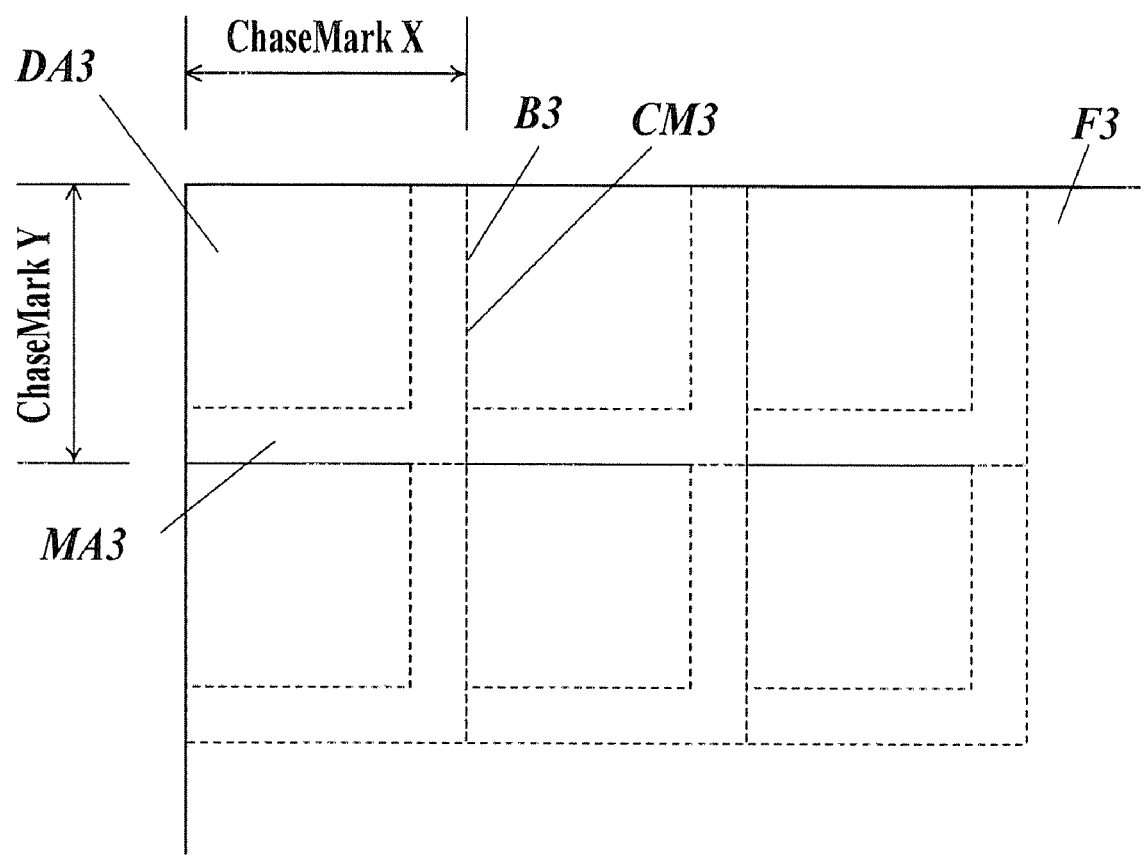
FIG. 11 shows chasing marks in blocks according to a second embodiment of the present invention.
Figure 12:
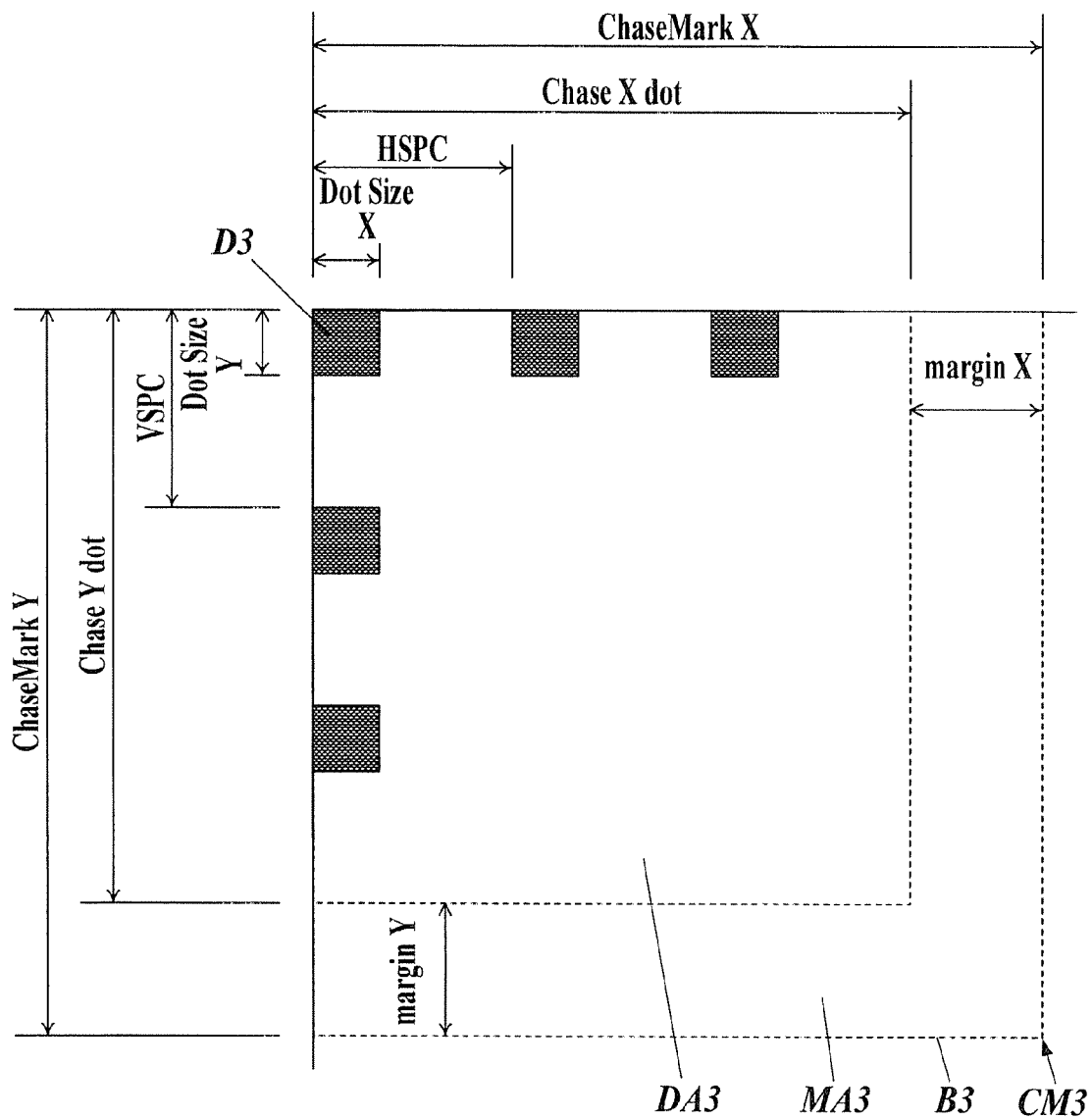
FIG. 12 shows an enlarged view of the chasing mark.

Next, referring to FIGS. 11 to 15, an operation of the image forming apparatus 1 according to this embodiment will be described. In this embodiment, the image forming apparatus 1 for forming a single-sided image will be described. First, referring to FIGS. 11 to 14B, an example of a chasing mark as an additional image in this embodiment will be described. FIG. 11 shows chasing marks CM3 in blocks B3. FIG. 12 shows an enlarged view of the chasing mark CM3.

In this embodiment, chasing marks are arranged in blocks, and a start position of a pattern image of the chasing mark is adjusted within the block. As shown in FIG. 11, the chasing marks CM3, which are formed in an image valid area F3 on a sheet, are arranged in blocks B3 in a horizontal direction and a vertical direction. The block B3 has a dot area DA3 as a pattern image (chase pattern) including chasing mark dots, and a variable margin area MA3 that does not include chasing mark dots. The horizontal length of the chasing mark CM3 is set as chasing mark size ChaseMarkX and the vertical length of the chasing mark CM3 is set as chasing mark size ChaseMarkY.

As shown in FIG. 12, in the chasing mark CM3, the horizontal length of the dot area DA3 is set as chasing mark X size ChaseXdot and the vertical length of the dot area DA3 is set as chasing mark Y size ChaseYdot. With respect to the margin area MA3, the horizontal length is set as a chasing mark block X interval marginX, and the vertical length is set as a chasing mark block Y interval marginY. A dot formation interval of the chasing mark dot D3 in a horizontal direction is set as a horizontal direction dot formation X interval HSPC. A dot formation interval of the chasing mark dot D3 in a vertical direction is set as a vertical direction dot formation Y interval VSPC. The dot size of the chasing mark dot D3 in a horizontal direction is set as horizontal direction dot X size DotSizeX. The dot size of the chasing mark dot D3 in a vertical direction is set as vertical direction dot Y size DotSizeY. The maximum number of the chasing mark dots D3 in the chasing mark CM3 (dot area DA3) in a horizontal direction is set as the character number Char_NUM_X, and the maximum number of the chasing mark dots D3 in the chasing mark CM3 in a vertical direction is set as the character number Char_NUM_Y.

The chasing mark block X interval marginX is defined as the dot X size DotSizeX or more. The chasing mark block Y interval marginY is defined as the dot Y size DotSizeY or more. The chasing mark block start positions when the shift amount is zero are a multiple of (ChaseXdot+marginX, ChaseYdot+marginY).

As shown in FIG. 12, for example, in the chasing mark CM3, the chasing mark X size ChaseXdot=18, the chasing mark Y size ChaseYdot=18, the chasing mark block X interval marginX=4, and the chasing mark block Y interval marginY=4 are set. In the chasing mark dot D3, the dot formation X interval HSPC=6, the dot formation Y interval VSPC=6, the dot X size DotSizeX =2, and the dot Y size DotSizeY=2 are set. In the dot area DA3, the character number Char_NUM_X=3 and the character number Char_NUM_Y=3 are set.

Figure 13:
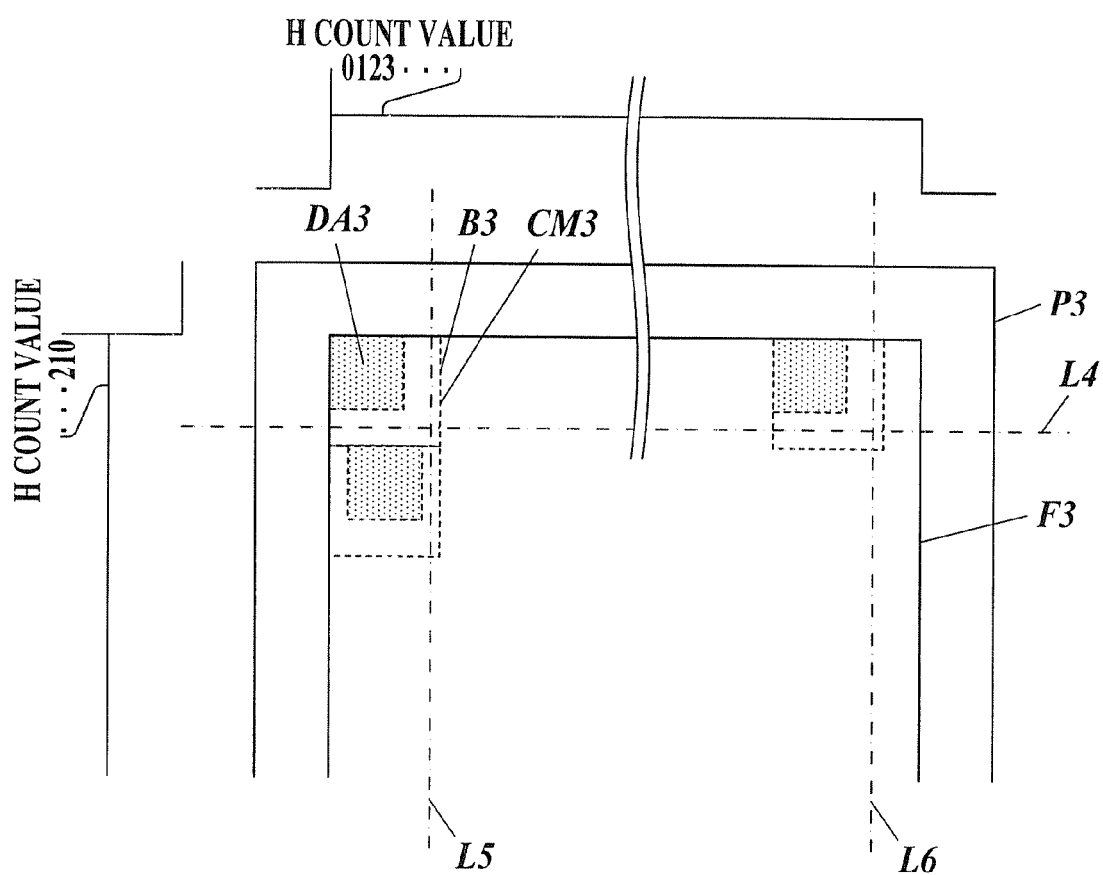
FIG. 13 shows relationships between a count value of a horizontal valid signal, a count value of a vertical valid signal, and a chasing mark.

FIG. 13 shows relationships between a count value of a horizontal valid signal HV, a count value of a vertical valid signal VV, and a chasing mark CM3. As shown in FIG. 13, in a valid range of the horizontal valid signal HV and the vertical valid signal VV, an image is formed in the image valid area F3 on the sheet P3. An image forming position on the sheet P3 (image valid area F3) is specified on the basis of a count value (first count value) of the horizontal valid signal HV and a count value (second count value) of the vertical valid signal VV that are output from the counter 142. For example, when an edge of a image-formed object coincides with one of the sheet cutting positions L4, L5, and L6, the dot area DA3 is shifted within each block B3 of the chasing mark CM3. Thus, each dot area DA3 and the sheet cutting positions L4, L5, and L6 do not overlap with each other.

As described above, since the positional relationship between the chasing mark dots D3 in the block B3 is constant, the generation position of the chasing mark dot D3 in the block B3 can be predicted. In the above case, the coordinates (x, y) that are indicated by the chasing mark dots D3 of the chasing mark CM3 in the k-th (k=0, 1, . . . : an integer) block are represented by the following Equations (1) and (2).

$$x = (ChaseXdot + marginX) * K + HSPC * (0 \text{ to } Char\_NUM\_X - 1) + (0 \text{ to } DotsizeX - 1) \quad (1)$$

$$y = (ChaseYdot + marginY) * K + VSPC * (0 \text{ to } Char\_NUM\_Y - 1) + (0 \text{ to } DotsizeY - 1) \quad (2)$$

k depends on each image size. For example, in the case of an image that has a 1000 pixel width in a horizontal direction, 1000/(ChaseXdot+marginX)=45 is obtained, and 45 chasing marks CM3 are arranged in a horizontal direction in an image.

Further, the x coordinates that have the possibility of the chasing mark dots of the horizontal direction appearing become the following coordinates from Equation (1).

(18+4)*0+6*0+0=0
(18+4)*0+6*0+1=1
(18+4)*0+6*1+0=6
(18+4)*0+6*1+1=7
(18+4)*0+6*2+0=12
(18+4)*0+6*2+1=13
(18+4)*1+6*0+0=22
(18+4)*1+6*0+1=23
(18+4)*1+6*1+0=28
(18+4)*1+6*1+1=29
(18+4)*1+6*2+0=34
(18+4)*1+6*2+1=35

. . .

(18+4)*44+6*0+0=968
(18+4)*44+6*0+1=969

. . .

For example, when the horizontal direction x coordinates 968 become the sheet cutting position by the designation of the sheet cutting amount and the shift amount of the dot area DA3 of the final 45-th block B3 in the horizontal direction is zero, as shown in FIG. 13, it is assumed that the sheet cutting position L6 overlaps the dots. At this time, when the sheets P3 overlap, the chasing mark dots D3 of the x coordinates 968 may appear as stripes.

Accordingly, in this case, by changing the shift amount by the dot x size DotSizeX+1=3, the x coordinates of the chasing mark dots of the final block become 968+3=971 and 969+3=972, and do not overlap the sheet cutting position L6.

Figure 14A:
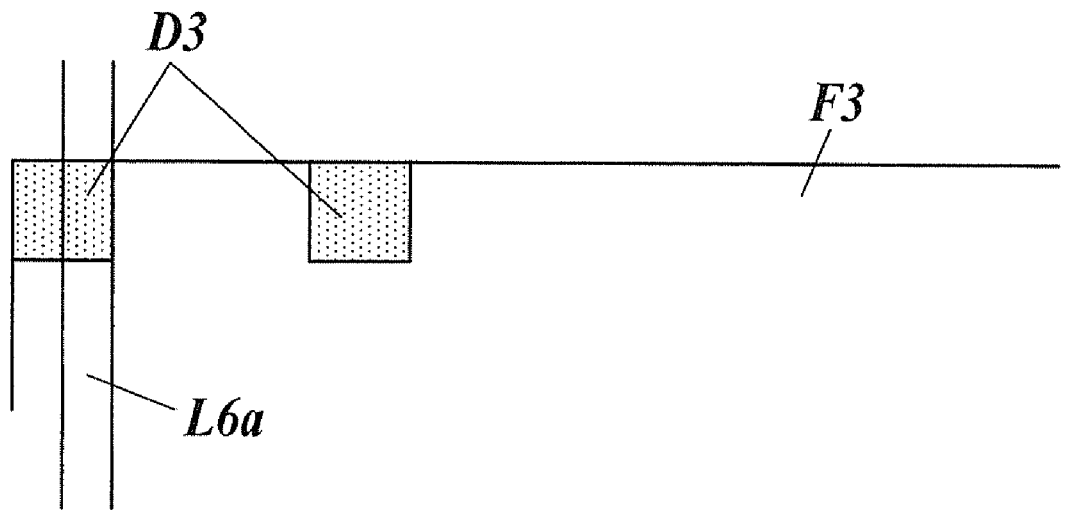
FIG. 14A shows a relationship between a sheet cutting position and chasing mark dots before the shift according to the second embodiment.

FIG. 14A shows a relationship between a sheet cutting position L6a and chasing mark dots D3 before the shift. FIG.

Figure 14B:
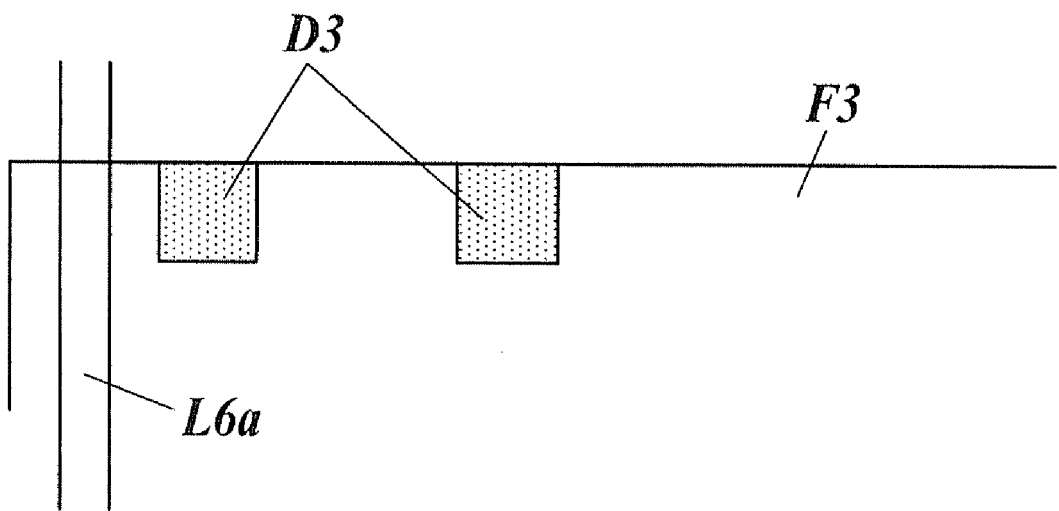
FIG. 14B shows a relationship between the sheet cutting position and the chasing mark dots after the shift according to the second embodiment.

14B shows a relationship between the sheet cutting position L6a and the chasing mark dots D3 after the shift. As shown in FIGS. 14A and 14B, when the positions of the chasing mark dots D3 in a final block B3 coincide with the sheet cutting position L6a, if the dot area DA3 in the block B3 is shifted by 3 in a horizontal direction as calculated above, the positions of the chasing mark dots D3 deviate from the sheet cutting position L6a on the sheet.

Figure 15:
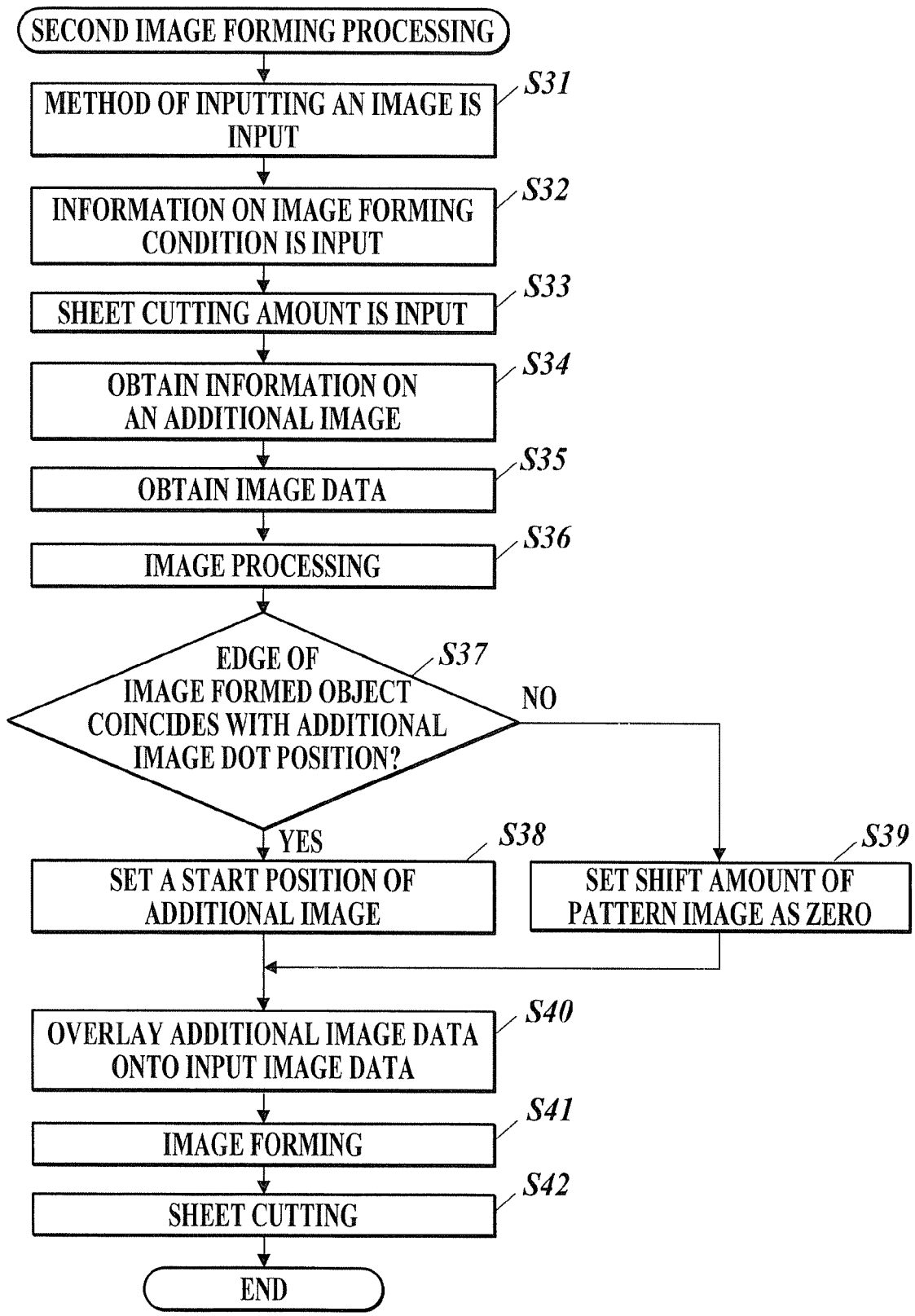
FIG. 15 shows a flowchart of a second image forming processing.

Next, referring to FIG. 15, a second image forming processing executed by the image forming apparatus 1 will be described. FIG. 15 shows a flow of the second image forming processing.

The second image forming processing is executed under the control of the control unit 10 when an execution instruction of the image forming processing is input through the operation unit 30. In the second image forming processing, chasing marks are arranged in blocks and overlaid onto an image data.

Steps S31 to S33 are the same as Steps S11 to S13 of the first image forming processing. Next, information on an additional image is obtained (Step S34). In Step S34, for example, as the information about the additional image, pattern image data that is moved in a block of a chasing mark as an additional image is generated by the chase pattern generating unit 143. In addition to the pattern image data, the chasing mark size ChaseMarkX, the chasing mark size ChaseMarkY, the chasing mark X size ChaseXdot, the chasing mark Y size ChaseYdot, the chasing mark block X interval marginX, the chasing mark block Y interval marginY, the dot X interval HSPC, the dot Y interval VSPC, the dot X size DotSizeX, the vertical direction dot Y size DotSizeY, the character number Char_NUM_X, and the character number Char_NUM_Y are read out from the storage unit 15 and acquired.

Steps S35 to S37 are the same as Steps S15 to S17 of the first image forming processing. If the edge of the image-formed object corresponds to the additional image dot position (Step S37; YES), the additional image start position (dot area formation start position for each block) is determined and set by the overlaid position control unit 141 (Step S38). The dot area image start position is set for each block so that the sheet cutting position or the sheet edge cannot overlap with the dot area, as shown in FIG. 13. The shift amount of the pattern image (chase pattern) is not less than the width of the chasing mark dot (the dot X size DotSizeX or the dot Y size DotSizeY) but less than the block interval of the chasing mark (the chasing mark block X interval marginX or the chasing mark block Y interval marginY).

If the edge of the image-formed object does not correspond to the additional image dot position (Step S37; NO), the shift amount of the dot area image start position for each block is set as zero by the overlaid position control unit 141, without shifting the dot area, of the chasing mark as the pattern image (Step S39).

Steps S40 to S42 are the same as Steps S21 to S23 of the first image forming processing.

As described above, according to this embodiment, the chasing marks for chasing a source of the image formation can be formed in blocks on the sheet. The pattern image is shifted by the shift amount that is not less than the dot X size and the dot Y size but less than the chasing mark block X interval and the chasing mark block Y interval, and thus the pattern image is shifted in the block. Therefore, the chasing mark dots do not overlap with the sheet cutting position of the image-formed sheets or the sheet edge of the full bleed image-formed sheets, and patterns, which are generated due to chase pattern dots at a side of the cutting position of a stack of the image-formed sheets or at a side of a stack of the full bleed image-formed sheets, become less noticeable.

When the full bleed image forming is instructed, if the sheet edge coincides with one of the chase pattern dot positions, the overlaid positions of the image patterns are shifted. For this reason, the chasing mark dots do not overlap with the edge of the full bleed image-formed sheet, and patterns, which are generated due to chase pattern dots at a side of a stack of the full bleed image-formed sheets, become less noticeable. Moreover, unnecessary shifting process can be prevented.

When the sheet cutting is performed, if the sheet edge (sheet cutting position) after the sheet cutting coincides with the chasing mark dot position, the overlaid positions of the image patterns are shifted. Therefore, the chasing mark dots do not over lap with the sheet cutting position of the image-formed sheets, and patterns, which are generated due to chase pattern dots at a side of the cutting position of a stack of the image-formed sheets, become less noticeable. Moreover, unnecessary shifting process can be prevented.

In addition, with respect to only the block that overlaps the sheet cutting position of the sheets or the sheet edge, the shift amount of the image pattern can be set, and overlaid positions of the pattern images are shifted. For this reason, the chasing mark dots do not overlap the sheet cutting position of the image-formed sheets or the edge of the full bleed image-formed sheets, and patterns, which are generated due to chase pattern dots at a side of the cutting position of a stack of the image-formed sheets or at a side of a stack of the full bleed image-formed sheets, become less noticeable. Furthermore, the shift amount of the pattern image may be set for each block. Even in this configuration, similarly, patterns, which are generated due to chase pattern dots at a side of the cutting position of a stack of the image-formed sheets or at a side of a stack of the full bleed image-formed sheets, become less noticeable.

Modifications

Referring to FIGS. 16A to 18, modifications of the individual embodiments will be described. In the following modifications, as in the first embodiment, it is assumed that the shift amount of the chasing mark is not less than the width of the chasing mark dot.

(First Modification)

Figure 16A:
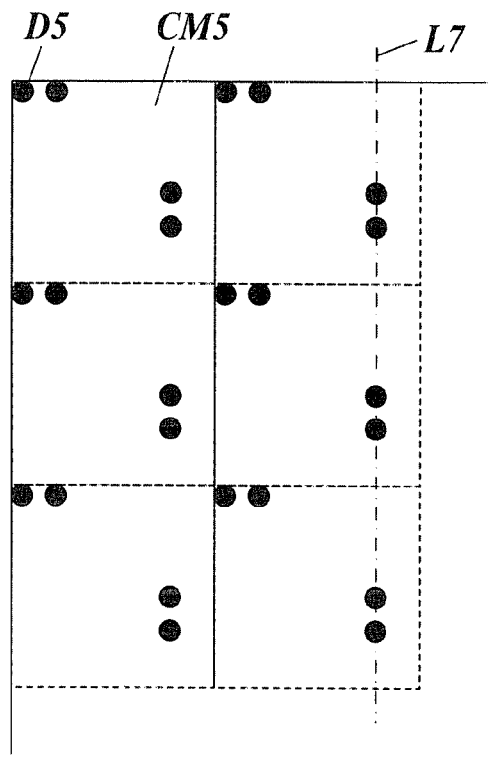
FIG. 16A shows chasing marks and a sheet cutting position before shifting chasing mark dots according to a first modification of the first embodiment.
Figure 16B:
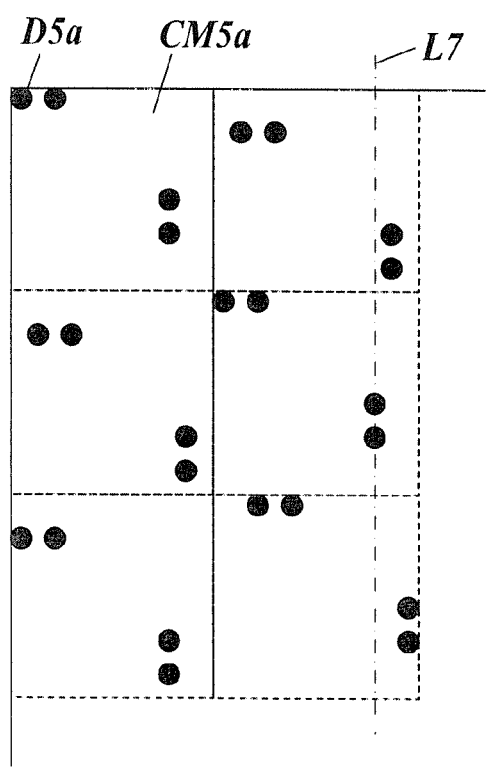
FIG. 16B shows the chasing marks and the sheet cutting position after shifting the chasing mark dots according to the first modification.

In a first modification as a modification of the first embodiment, dots in a chasing mark are shifted at random. FIG. 16A shows chasing marks CM5 and a sheet cutting position L7 before shifting chasing mark dots D5. FIG. 16B shows the chasing marks CM5a and the sheet cutting position L7 after shifting the chasing mark dots D5.

As shown in FIG. 16A, when the chasing marks CM5 are arranged to form an image, the positions of the chasing mark dots D5 in the chasing marks CM5 may coincide with the sheet cutting position L7. For this reason, as shown in FIG. 16B, in the image forming apparatus 1, it is assumed that the dots in the chasing marks are randomly shifted to form chasing mark dots D5a. Since the chasing marks CM5a having the chasing mark dots D5a are arranged, it is highly likely that the chasing mark dots D5a do not overlap with the sheet cutting position L7. The dot movement amount (shift amount) is random for each chasing mark CM5.

According to this modification, the overlaid position of the chasing mark is shifted on the basis of an overlay start position that is randomly generated. For this reason, the chase pattern dots do not overlap the sheet cutting position of the image-formed sheets or the edge of the full bleed image-formed sheets. Therefore, patterns, which are generated due to chase pattern dots at a side of the cutting position of a stack of the image-formed sheets or at a side of a stack of the full bleed image-formed sheets, become less noticeable.
(Second Modification)

Figure 17:
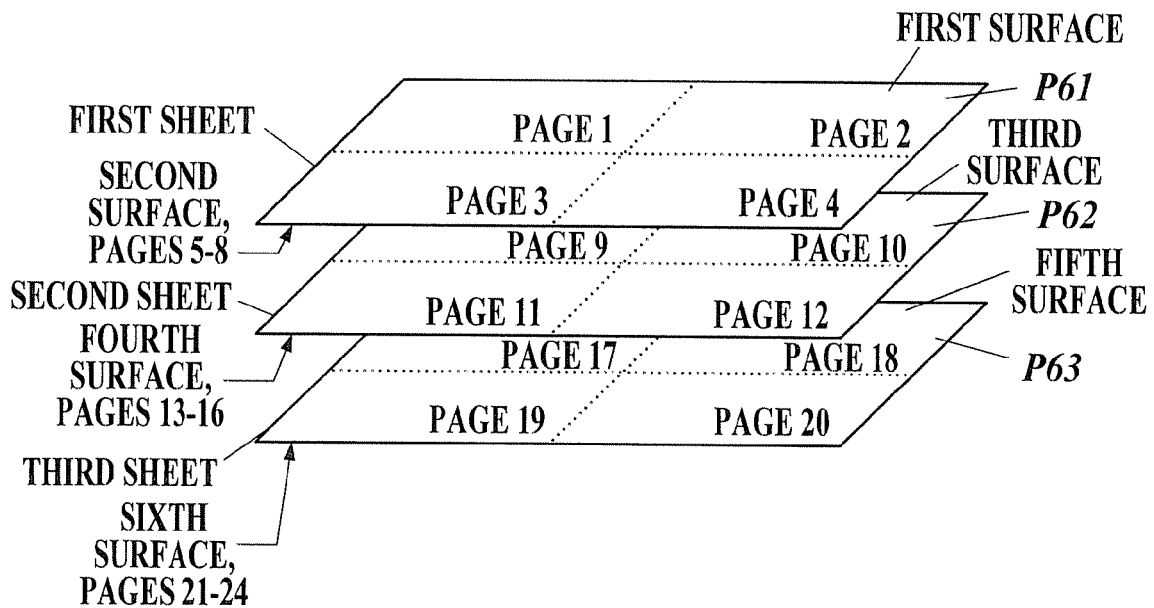
FIG. 17 shows sheets on each of which double-sided images are formed at 4in1.
Figure 18:
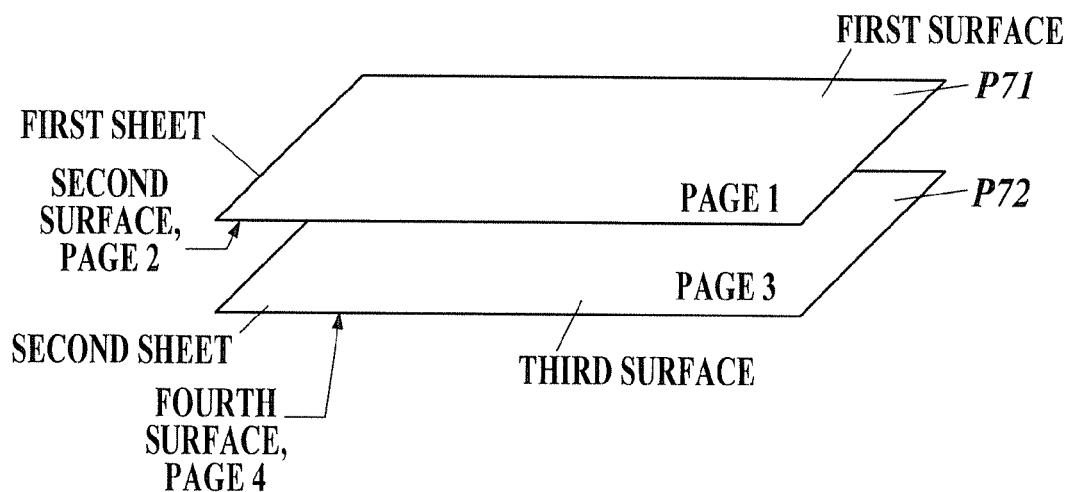
FIG. 18 shows sheets each of on which double-sided images are formed.
Figure 19A:
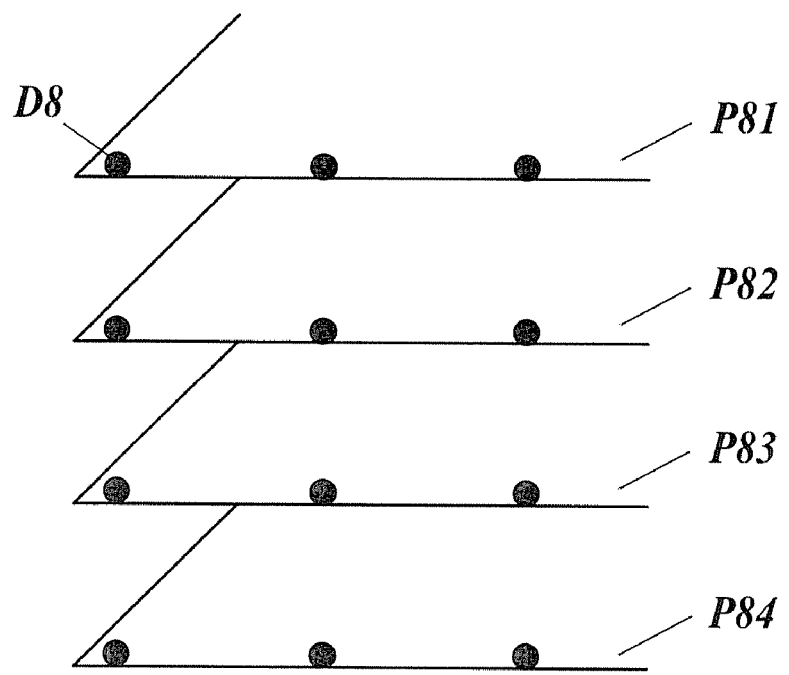
FIG. 19A shows sheets on each of which chase pattern dots are formed according to a conventional technique.
Figure 19B:
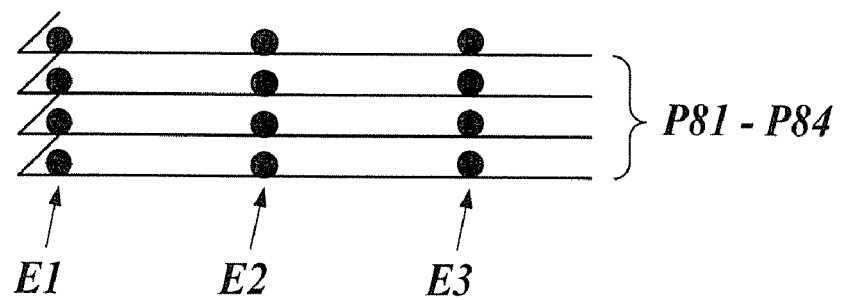
FIG. 19B shows the sheets on each of which the chase pattern dots are formed, being stacked according to a conventional technique.
Figure 20:
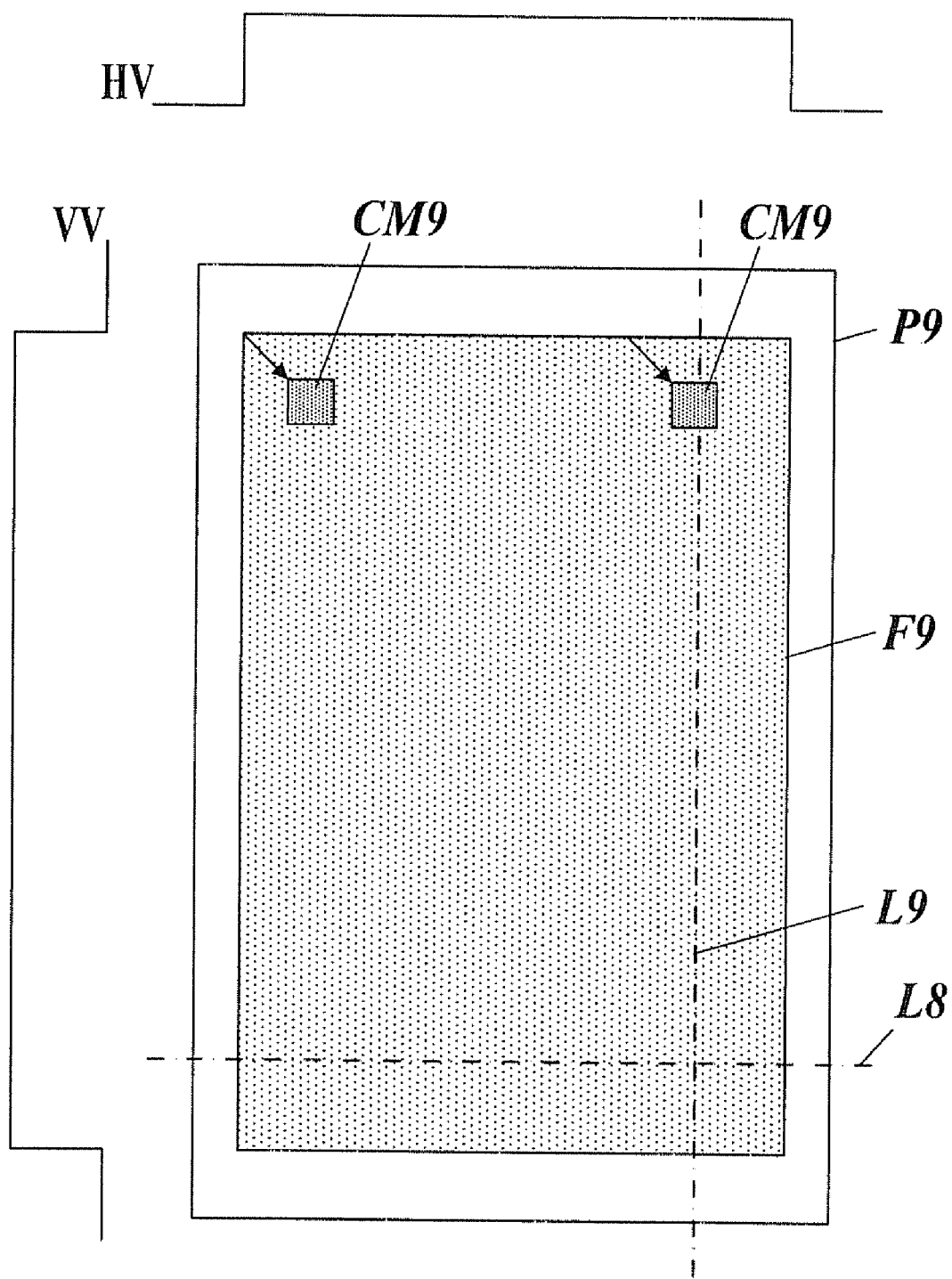
FIG. 20 shows a sheet on which chasing marks are simply shifted.

Next, with reference to FIGS. 17 and 18, a second modification of the individual embodiments will be described. FIG. 17 shows sheets P6 on each of which double-sided images are formed at 4in1. FIG. 18 shows sheets P7 on each of which double-sided images are formed.

In the first embodiment, when a single-sided image is formed, the chasing mark dots do not continuously overlap the sheet cutting position or the sheet edge for each page (one page of a sheet and one surface of the sheet). However, the present invention is not limited to the first embodiment.

For example, when the double-sided image is formed at 4in1, the chasing mark dots may not continuously overlap the sheet cutting position or the sheet edge for each image of a sheet (for a page). For example, in sheets P61 to P63 of FIG. 17, in the first page of the first surface of the first sheet P61, the fifth page (page that is back to back with respect to the first page) of the second surface thereof, and the ninth page of the second sheet P62, the image forming positions of the chasing marks may be different from each other. In this way, even when the sheet P6 is cut for each page, stripes of the chasing marks do not appear at the sheet cutting position. Even in the configuration where a plurality of images are formed on one surface other than 4in1, such as 2in1, the chasing mark dots may not overlap for each page.

According to this configuration, when a plurality of pages of images are formed on one surface of a sheet and a double-sided image is formed, an overlaid position on N-th (N: natural number) sheet and an overlaid position on (N+1)-th sheet are deviated from each other on pages of the N-th sheet and the (N+1)-th sheet at the same position. Moreover, overlaid positions on both surfaces of a sheet are deviated from each other on pages of both surfaces at the same position. For this reason, the chasing mark dots do not overlap the sheet cutting position of the image-formed sheets or the edge of the full bleed image-formed sheets. Therefore, patterns, which are generated due to chase pattern dots at a side of the cutting position of a stack of the image-formed sheets or at a side of a stack of the full bleed image-formed sheets, become less noticeable.

For example, as shown in FIG. 18, when forming the double-sided images, the chasing mark dots may not continuously overlap the sheet cutting position or the sheet edge for each surface of the sheet P71 and the sheet P72. With this configuration, when the double-sided image is formed, an overlaid position of the chasing marks on N-th (N: natural number) surface and an overlaid position of the chasing marks on (N+1)-th surface are deviated from each other. Therefore, the chase pattern dots do not overlap the sheet cutting position of the image-formed sheets or the edge of the full bleed image-formed sheets, and patterns, which are generated due to chase pattern dots at a side of the cutting position of a stack of the image-formed sheets or at a side of a stack of the full bleed image-formed sheets, become less noticeable.

When the trimmed image-formed sheets are stacked, the chasing mark dots may not continuously overlap the sheet cutting position or the sheet edge for each page in view of pages after the stacking.

The description of the embodiments and modifications is only related to the image forming apparatus according to the preferred examples of the present invention, but the present invention is not limited thereto.

For example, in the individual embodiments and the individual modifications, the configuration of the chasing mark or the pattern image that has the chasing mark dots as the chase pattern is described, but the present invention is not limited thereto. A chase pattern that has another pattern image may be used.

In the respective embodiments and the respective modifications, at least two configurations described below may be combined. Hereinafter, the description is made on the assumption that the chasing mark or the pattern image in the chasing mark is the chase pattern, and the chasing mark dots are the chase pattern dots. Even in the configurations described below, it is assumed that the shift amount of the chase pattern is not less than the width of the chase pattern dot.

In the setting of the overlaid positions of the chase patterns when forming a double-sided image, the overlaid positions of the chase patterns may be shifted for each page, each sheet, or each surface of a sheet. With this configuration, the chase pattern dots do not overlap the sheet cutting position of the image-formed sheets or the edge of the full bleed image-formed sheets, and patterns, which are generated due to chase pattern dots at a side of the cutting position of a stack of the image-formed sheets or at a side of a stack of the full bleed image-formed sheets, become less noticeable.

When a plurality of pages of images are formed on one surface of a sheet and a single-sided image is formed, in the setting of the overlaid positions of the chase patterns, the overlaid positions may be controlled such that an overlaid position on N-th (N: natural number) sheet and an overlaid position on (N+1)-th sheet are deviated from each other on a page of the N-th sheet and on a page of the (N+1)-th sheet at the same position. With this configuration, the chase pattern dots do not overlap the sheet cutting position of the image-formed sheets or the edge of the full bleed image-formed sheets, and patterns, which are generated due to chase pattern dots at a side of the cutting position of a stack of the image-formed sheets or at a side of a stack of the full bleed image-formed sheets, become less noticeable.

In the setting of the overlaid positions of the chase patterns, the overlaid positions may be controlled such that the overlaid positions are shifted every predetermined plurality of pages, every predetermined plurality of sheets, or every predetermined plurality of surfaces of sheets. With this configuration, the chase pattern dots do not overlap the sheet cutting position of the image-formed sheets or the edge of the full bleed image-formed sheets, and patterns, which are generated due to chase pattern dots at a side of the cutting position of a stack of the image-formed sheets or at a side of a stack of the full bleed image-formed sheets, become less noticeable.

In the setting of the overlaid positions of the chase patterns, with respect to the main scanning direction and the sub scanning direction, the overlaid positions of the chase patterns may be shifted. With this configuration, the chase pattern dots do not overlap the sheet cutting position of the image-formed sheets or the edge of the full bleed image-formed sheets, and patterns, which are generated due to chase pattern dots at a side of the cutting position of a stack of the image-formed sheets or at a side of a stack of the full bleed image-formed sheets, become less noticeable.

The image forming apparatus may include a storage unit (for example, storage unit 15) that stores a plurality of preset shift amounts. In the setting of the overlaid positions of the chase patterns, one shift amount may be selected from the shift amounts that are stored in the storage unit, and each of the overlaid positions of the chase patterns may be shifted by the selected shift amount. With this configuration, the shift amount may easily be selected. The chase pattern dots do not overlap the sheet cutting position of the image-formed sheets or the edge of the full bleed image-formed sheets, and patterns, which are generated due to chase pattern dots at a side of the cutting position of a stack of the image-formed sheets or at a side of a stack of the full bleed image-formed sheets, become less noticeable.

With respect to the detailed configurations and operations of the respective elements of the image forming apparatus 1 in the above-described embodiments and modifications, it will be apparent to those skilled in the art that various modification and variations can be made without departing from the scope of the invention.

The present U.S. patent application claims a priority under the Paris Convention of Japanese patent application No. 2008-36228 filed on Feb. 18, 2008 which shall be a basis of correction of an incorrect translation.

What is claimed is:

1. An image forming apparatus, comprising:
    an image input unit to input image data;
    a chase pattern generating unit to generate a chase pattern in which a plurality of chase pattern dots, each of which has a plurality of print dots, are arranged within a predetermined block;
    an overlay unit to overlay a plurality of chase patterns onto the image data;
    an image forming unit to form an image on a sheet based on the image data onto which the plurality of chase patterns is overlaid; and
    an overlaid position control unit to control an overlaid position of a chase pattern on the image data on N-th surface, wherein N is a natural number, of the sheet and (N+1)-th surface of the sheet, so as to shift the overlaid position by a shift amount that is equal to or more than a width of each of the chase pattern dots and equal to or less than an interval between the blocks of the chase patterns, if an edge of each of the sheets coincides with a position of at least one of the chase pattern dots, when full bleed image forming on both surfaces of a plurality of sheets is instructed.

2. The image forming apparatus of claim 1, wherein the overlaid position control unit controls the overlaid position so that the overlaid position is shifted for each page, each sheet, or each surface of a sheet.

3. The image forming apparatus of claim 1, wherein when a plurality of pages of images are formed on one surface of a sheet and single-sided images are formed, the overlaid position control unit controls an overlaid position on N-th sheet and an overlaid position on (N+1)-th sheet so that both of the overlaid positions are deviated from each other on pages of the N-th sheet and the (N+1)-th sheet at the same position.

4. The image forming apparatus of claim 1, wherein when a plurality of pages of images are formed on one surface of a sheet and when images are formed on both surfaces of a sheet, the overlaid position control unit controls an overlaid position on N-th sheet and an overlaid position on (N+1)-th sheet so that both of the overlaid positions are deviated from each other on pages of the N-th sheet and the (N+1)-th sheet at the same position, and controls overlaid positions on both surfaces of a sheet so that both of the overlaid positions are deviated from each other on pages of both surfaces at the same position.

5. The image forming apparatus of claim 1, wherein the overlaid position control unit controls the overlaid position so that the overlaid position is shifted every predetermined plurality of pages, every predetermined plurality of sheets, or every predetermined plurality of surfaces of sheets.

6. The image forming apparatus of claim 1, wherein the overlaid position control unit controls the overlaid position so that the overlaid position is shifted in a main scanning direction and a sub scanning direction.

7. The image forming apparatus of claim 1, wherein the overlaid position control unit controls the overlaid position so that the overlaid position is shifted based on an overlay start position that is generated at random.

8. The image forming apparatus of claim 1, further comprising a storage unit to store a plurality of shift amounts, wherein
    the overlaid position control unit selects one of the plurality of shift amounts stored in the storage unit, and controls the overlaid position so that the overlaid position is shifted by the selected one of the plurality of shift amounts.

9. The image forming apparatus of claim 1, further comprising a cutting unit to cut out a stack of sheets at a sheet cutting position, wherein
    the overlaid position control unit controls the overlaid position so that the overlaid position is shifted if the cutting position coincides with a position of at least one of the chase pattern dots.

10. The image forming apparatus of claim 9, further comprising an input unit to input at least a sheet cutting amount by the cutting unit, wherein
    the overlaid position control unit determines the cutting position based on at least a sheet cutting amount that is input by the input unit.

11. The image forming apparatus of claim 9, wherein the overlaid position control unit sets the shift amount with respect to the block whose position coincides with the sheet cutting position or an edge of each of the sheets.

12. The image forming apparatus of claim 1, wherein the overlaid position control unit controls overlaid positions so that each of the overlaid positions is shifted for each of the blocks.

13. An image forming method of forming an image on a sheet based on image data, the method comprising:
    generating a chase pattern in which a plurality of chase pattern dots, each of which has a plurality of print dots, are arranged within a predetermined block;
    overlaying a plurality of chase patterns onto the image data so that an overlaid position of a chase pattern on the image data on N-th surface of the sheet and (N+1)-th surface of the sheet is shifted by a shift amount that is equal to or more than a width of each of the chase pattern dots and equal to or less than an interval between the blocks of the chase patterns, if an edge of each of the sheets coincides with a position of at least one of the chase pattern dots, when full bleed image forming on both surfaces of a plurality of sheets is instructed;
    and forming images on the sheets based on the image data onto which the chase pattern is overlaid.

14. The image forming method of claim 13, wherein in the overlaying, a plurality of chase patterns, one of which is the chase pattern, are overlaid onto the image data so that the chase patterns can be arranged in blocks, and an overlaid position of each of the chase patterns on the image data is shifted by the shift amount that is equal to or more than a width of each of the chase pattern dots and is equal to or less than an interval between the blocks.

15. The image forming method of claim 13, wherein in the overlaying, the overlaid position is shifted for each page, each sheet, or each surface of a sheet.

16. The image forming method of claim 13, wherein
  in the overlaying, the overlaid position is shifted every predetermined plurality of pages, every predetermined plurality of sheets, or every predetermined plurality of surfaces of sheets.

17. The image forming method of claim 13, further comprising: cutting out a stack of sheets at a sheet cutting position, wherein
  in the overlaying, the overlaid position is shifted if the cutting position coincides with a position of at least one of the chase pattern dots.

* * * * *